United States Patent
Ohno et al.

(10) Patent No.: US 7,576,035 B2
(45) Date of Patent: Aug. 18, 2009

(54) HONEYCOMB STRUCTURE AND METHOD FOR MANUFACTURING HONEYCOMB STRUCTURE

(75) Inventors: Kazushige Ohno, Ibi-gun (JP); Tomokazu Oya, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/098,786

(22) Filed: Apr. 7, 2008

(65) Prior Publication Data
US 2008/0254254 A1 Oct. 16, 2008

Related U.S. Application Data

(63) Continuation of application No. PCT/JP2006/326285, filed on Dec. 28, 2006.

(30) Foreign Application Priority Data
May 1, 2006 (JP) ............................. 2006-127694

(51) Int. Cl.
*B01J 23/02* (2006.01)
*B01J 23/10* (2006.01)
*B01J 23/16* (2006.01)
*B01J 23/70* (2006.01)
*B01J 35/04* (2006.01)
*B29C 39/00* (2006.01)
*B29C 47/00* (2006.01)
*C01B 31/36* (2006.01)
*C01B 33/113* (2006.01)
*C01F 7/02* (2006.01)
*C01G 23/047* (2006.01)
*C01G 25/02* (2006.01)

(52) U.S. Cl. ............... 502/439; 502/178; 502/304; 502/324; 502/325; 502/328; 502/330; 502/331; 502/332; 502/335; 502/336; 502/337; 502/338; 502/340; 502/341; 502/344; 502/345; 502/346; 502/349; 502/350; 502/355; 428/116; 428/117; 428/188; 428/373; 428/374; 55/343; 55/350.1; 55/523; 55/524; 55/527; 264/177.12; 264/629; 264/630; 264/681; 264/682; 423/325; 423/326; 423/327.1; 423/335; 423/345; 423/439; 423/440; 423/592.1; 423/593.1; 423/600; 423/608; 423/610; 423/624; 423/625

(58) Field of Classification Search ............... 502/439, 502/178, 232, 240–244, 258–260, 263, 302, 502/304, 324, 325, 328, 330–332, 335–338, 502/340, 341, 344–346, 350, 355, 349; 55/523, 55/524, 527, 342, 343, 346–348, 350.1, 521; 428/116, 117, 73, 188, 34.5, 373, 374; 264/177.1, 264/177.12, 630, 177.17, 177.18, 219, 220, 264/605, 607, 629, 640, 681, 682; 423/325, 423/326, 327.1, 335, 345, 339, 340, 592.1, 423/593.1, 600, 608, 610, 624, 625
See application file for complete search history.

(56) References Cited

U.S. PATENT DOCUMENTS
3,751,271 A 8/1973 Kimura et al.
(Continued)

FOREIGN PATENT DOCUMENTS
DE 4343301 6/1995
(Continued)

*Primary Examiner*—Timothy C Vanoy
*Assistant Examiner*—Serena L Hanor
(74) *Attorney, Agent, or Firm*—Ditthavong Mori & Steiner, P.C.

(57) ABSTRACT

A pillar-shaped honeycomb structure has a plurality of cells longitudinally placed in parallel with one another with a wall portion therebetween, wherein the honeycomb structure mainly includes inorganic fibers which form the honeycomb structure without lamination interfaces.

25 Claims, 10 Drawing Sheets

U.S. PATENT DOCUMENTS

| | | | |
|---|---|---|---|
| 4,264,346 A | 4/1981 | Mann | |
| 5,348,987 A | 9/1994 | Kato et al. | |
| 5,510,063 A | 4/1996 | Gadkaree et al. | |
| 5,702,508 A | 12/1997 | Moratalla | |
| 7,455,709 B2 * | 11/2008 | Ohno et al. | 55/523 |
| 2005/0266991 A1 | 12/2005 | Ohno et al. | |
| 2006/0032203 A1 * | 2/2006 | Komori et al. | 55/523 |
| 2006/0075731 A1 | 4/2006 | Ohno et al. | |
| 2007/0148402 A1 | 6/2007 | Ohno et al. | |
| 2007/0289275 A1 | 12/2007 | Ohno et al. | |
| 2008/0083201 A1 | 4/2008 | Oya et al. | |
| 2008/0176013 A1 | 7/2008 | Ohno et al. | |
| 2008/0276586 A1 | 11/2008 | Oya et al. | |
| 2008/0289307 A1 | 11/2008 | Ogyu et al. | |
| 2008/0295470 A1 | 12/2008 | Ogyu et al. | |

FOREIGN PATENT DOCUMENTS

| | | |
|---|---|---|
| DE | 19938932 | 2/2001 |
| EP | 0042301 | 12/1981 |
| EP | 0833726 | 4/1998 |
| EP | 1520614 | 4/2005 |
| EP | 1726698 | 11/2006 |
| EP | 1762710 | 3/2007 |
| FR | 1515158 | 3/1968 |
| GB | 1402206 | 8/1975 |
| JP | 61-171539 | 8/1986 |
| JP | 2-184340 | 7/1990 |
| JP | 4-002673 | 1/1992 |
| JP | 5-213681 | 8/1993 |
| JP | 8-332392 | 12/1996 |
| JP | 9-169548 | 6/1997 |
| JP | 2001-252529 | 9/2001 |
| JP | 2001-314768 | 11/2001 |
| JP | 2003-080031 | 3/2003 |
| JP | 2003-181300 | 7/2003 |
| WO | WO 2004111398 A1 * | 12/2004 |
| WO | WO 2005005018 A1 * | 1/2005 |
| WO | WO 2006/004175 | 1/2006 |

* cited by examiner

HONEYCOMB STRUCTURE AND METHOD FOR MANUFACTURING HONEYCOMB STRUCTURE

CROSS-REFERENCE TO RELATED APPLICATIONS

This application is a continuation application of PCT/JP2006/326285 filed on Dec. 28, 2006, entitled "HONEYCOMB STRUCTURE, METHOD FOR MANUFACTURING HONEYCOMB STRUCTURE, HONEYCOMB FILTER AND METHOD FOR MANUFACTURING HONEYCOMB FILTER," which claims priority of Japanese Patent Application No. 2006-127694 filed on May, 1, 2006. The contents of these applications are incorporated herein by reference in their entirety.

BACKGROUND OF THE INVENTION

1. Field of the Invention

The present invention relates to a honeycomb structure and a method for manufacturing the honeycomb structure.

2. Discussion of the Background

Particulate matters such as soot (hereinafter, also referred to as PMs) are contained in exhaust gases discharged from an internal combustion engine such as a diesel engine, and in recent years, these PMs have raised serious problems as contaminants harmful to the environment and the human body.

For this reason, various filters using ceramics honeycomb filters including cordierite, silicon carbide or the like have been proposed as filters that capture PMs in exhaust gases to purify the exhaust gases. Moreover, various filters of a lamination type, manufactured by laminating lamination members having through holes therein, have been proposed (for example, see WO 2005/000445A).

FIG. 1A is a perspective view that schematically illustrates one specific example of such a lamination-type honeycomb filter which is formed by laminating lamination members, each including a sheet-shaped inorganic fiber aggregated body with through holes, and FIG. 1B is an A-A line cross-sectional view of FIG. 1A. FIG. 1C is an enlarged cross-sectional view of a portion illustrated by B in FIG. 1B.

A honeycomb filter 100 has a cylindrical structure in which a number of cells 111 having either one of the ends sealed are longitudinally placed in parallel with each other with a wall portion 113 therebetween.

In other words, as illustrated in FIG. 1B, each of the cells 111 has either one of the end corresponding to the inlet side or the outlet side of exhaust gases sealed, so that exhaust gases, introduced into one cell 111, are allowed to flow out from another cell 111, after always having passed through the wall portion 113 separating the cells 111; thus, the wall portion 113 is allowed to function as a filter.

As illustrated in FIGS. 1A and 1B, the honeycomb filter is formed as a laminated body by laminating lamination members 110a having a sheet shape with a thickness of 0.1 to 20 mm, and the lamination members 110a are laminated, with through holes superposed on one another in the longitudinal direction.

Here, the state in which the through holes are laminated so as to be superposed on one another refers to a state in which the through holes formed in the adjacent lamination members are superposed successively so as to communicate with each other.

Moreover, a lamination member for an end portion 10b having through holes formed in a checkered pattern therein is laminated on each of the two end portions thereof so that either one of the ends of each of the cells 111 is sealed by the lamination member for an end portion 10b.

In order to form the respective lamination members into a laminated body, the lamination members 110a and the lamination member for an end portion 10b are laminated in a casing (metal tube-shaped (cylindrical) body) to be attached to an exhaust-gas pipe, and pressure is applied thereto. Thus, a honeycomb filter 100 is formed.

When an exhaust-gas purifying filter including a honeycomb filter having this structure is installed in an exhaust passage of an internal combustion engine, PMs in exhaust gases discharged from the internal combustion engine are captured by the wall portions 113 while passing through this honeycomb filter so that the exhaust gases are purified.

The contents of WO2005/000445A are incorporated herein by reference in their entirety.

SUMMARY OF THE INVENTION

According to a first aspect of the present invention, a pillar-shaped honeycomb structure includes a plurality of cells extending along a substantially longitudinal direction of the honeycomb structure with a wall portion therebetween, and inorganic fibers which form the honeycomb structure without lamination interfaces.

According to a second aspect of the present invention, a method for manufacturing the honeycomb structure includes mixing inorganic fibers A with inorganic fibers B and/or inorganic particles C to prepare a mixture, the inorganic fibers B and inorganic particles C having a melting temperature which is lower than a melting temperature or a sublimating temperature of the inorganic fibers A. The mixture is extrusion-molded to form a pillar-shaped molded body having a number of cells formed in a longitudinal direction, by using a die having holes. The pillar-shaped molded body is heated at a temperature equal to or lower than a heat-resistant temperature of the inorganic fibers A and at the temperature equal to or higher than a softening temperature of the inorganic fibers B and/or the inorganic particles C to produce a honeycomb structure.

According to a third aspect of the present invention, a method for manufacturing the honeycomb structure includes mixing inorganic fibers A, inorganic fibers B and/or inorganic particles C, and resin to prepare a mixture, the inorganic fibers B and inorganic particles C having a melting temperature which is lower than a melting temperature or a sublimating temperature of the inorganic fibers A, and providing a tube-shaped container having a plurality of cores therein. The cores are provided substantially in parallel with a longitudinal direction of the tube-shaped container and provided in a lattice pattern on a plane surface substantially vertical to the longitudinal direction. The mixture is filled into the container, and the resin contained in the mixture is cured to form a cured resin body. The cores are removed from the cured resin body to provide a pillar-shaped molded body having a number of cells formed in a longitudinal direction. The pillar-shaped molded body is heat-degreased to remove organic substances from the pillar-shaped molded body. The degreased body is further heated at a temperature equal to or lower than the heat-resistant temperature of the inorganic fibers A and equal to or higher than the softening temperature of the inorganic fibers B and/or the inorganic particles C to produce a honeycomb structure.

According to a fourth aspect of the present invention, a method for manufacturing a honeycomb structure includes mixing inorganic fibers A, inorganic fibers B and/or inorganic particles C, and resin to prepare a mixture. The inorganic fibers B and inorganic particles C have a melting temperature which is lower than a melting temperature or a sublimating temperature of the inorganic fibers A. The mixture is filled into a frame member which includes a bottom plate, pillar members for forming cells of the honeycomb structure, and an outer frame formed so as to enclose a periphery of the bottom plate and the pillar members. The Pillar members are connected to the bottom plate extending substantially perpendicularly to the bottom plate and arranged in a lattice pattern on the bottom plate. The resin contained in the mixture filled into the frame member is cured to form a cured resin body, and the pillar members are removed from the cured resin body and the frame member is detached to form a pillar-shaped molded body having a number of cells formed in a longitudinal direction. The pillar-shaped molded body is heat-degreased to remove organic substances from the pillar-shaped molded body. The degreased molded body is heated at a temperature equal to or lower than the heat-resistant temperature of the inorganic fibers A, and equal to or higher than the softening temperature of the inorganic fibers B and/or the inorganic particles C to produce a honeycomb structure.

According to a fifth aspect of the present invention, a method for manufacturing the honeycomb structure includes using a vessel having a vessel main body, a mesh formed on a bottom portion of the vessel main body, pillar-shaped masks that are installed substantially vertically to the mesh and in a lattice pattern on the mesh and that are used for forming cells of the honeycomb structure, and a liquid-filling cavity formed between the pillar-shaped masks. Inorganic fibers A are mixed with inorganic fibers B and/or inorganic particles C to prepare a mixture. The inorganic fibers B and inorganic particles C have a melting temperature which is lower than a melting temperature or a sublimating temperature of the inorganic fibers A. The mixture is provided into the liquid-filling cavity. By discharging moisture from the mixture through the mesh to dehydrate the mixture, a dehydrated body is formed. The pillar-shaped masks are removed from the dehydrated body to provide a pillar-shaped molded body having a number of cells formed in a longitudinal direction. The pillar-shaped molded body is heated at a temperature equal to or lower than the heat-resistant temperature of the inorganic fibers A and equal to or higher than the softening temperature of the inorganic fibers B and/or the inorganic particles C to produce a honeycomb structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
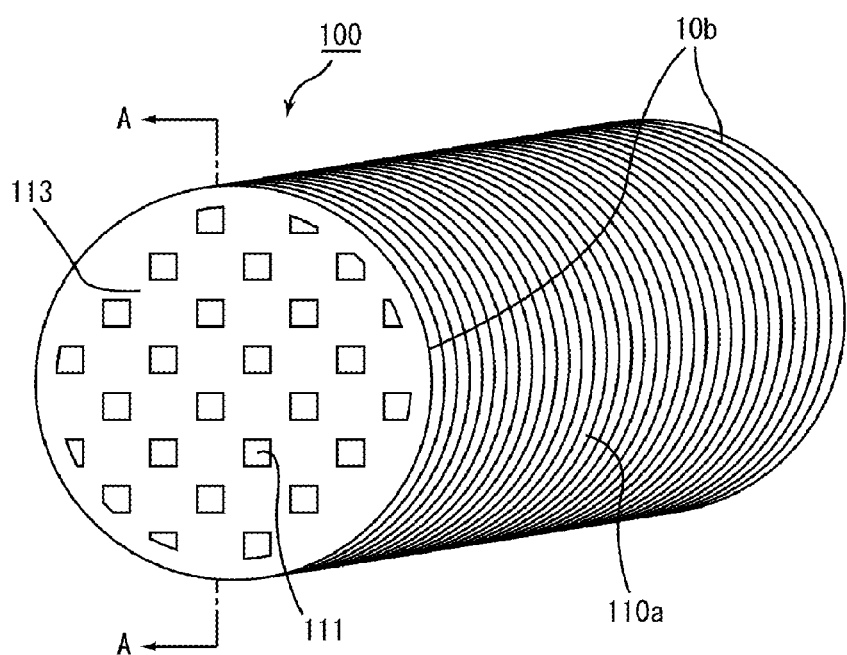
FIG. 1A is a perspective view that schematically illustrates a specific example of a lamination-type honeycomb filter which is formed by laminating lamination members. Each lamination member includes a sheet-shaped inorganic fiber aggregated body with through holes.

The embodiments will now be described with reference to the accompanying drawings, wherein like reference numerals designate corresponding or identical elements throughout the various drawings.

The honeycomb structure according to the embodiment of the first aspect of the present invention is a pillar-shaped honeycomb structure having a plurality of cells longitudinally placed in parallel with one another with a wall portion therebetween, wherein it mainly includes inorganic fibers which form the honeycomb structure without lamination interface.

Here, "without lamination interface" according to the embodiments of the present invention refers not to a structure in which the honeycomb structure is formed by aggregating some parts, but to a structure in which it is formed as a single inseparable unit or part by integrally forming the inorganic fibers therein.

The honeycomb structure according to the embodiment of the first aspect of the present invention mainly includes inorganic fibers with the inorganic fibers integrally formed therein and no lamination interface is formed therein. For this reason, it may become easier to provide a structure which can prevent the occurrence of portions in which inorganic fibers are distributed comparatively densely in the honeycomb structure, and consequently to manufacture a honeycomb structure that is free from an increase in the pressure loss due to the portions in which the inorganic fibers are distributed comparatively densely.

Moreover, the honeycomb structure according to the embodiment of the first aspect of the present invention desirably has the structure in which either one of the ends of each of the cells in the honeycomb structure is sealed, so that the honeycomb structure is allowed to function as a filter (hereinafter, also referred to as a honeycomb filter).

Furthermore, in the honeycomb structure according to the embodiment of the first aspect of the present invention, the honeycomb structure with either one of the ends of each of the cells being sealed, or the honeycomb structure and the lamination members for end portions mainly containing metal laminated on each of the two end portions of the honeycomb structure are preferably disposed in a metal container.

The honeycomb filter with either one of the ends of each of the cells in the honeycomb structure being sealed according to the embodiment of the first aspect of the present invention mainly includes inorganic fibers, with the inorganic fibers integrally formed therein, and has a structure in which either one of the ends of each of the cells of the honeycomb structure having no lamination interface is sealed so that it may become easier to prepare a honeycomb filter that is homogeneous and has a low pressure loss.

The method for manufacturing the honeycomb structure according to the embodiment of the second aspect of the present invention is a method for manufacturing a honeycomb structure according to the embodiment of the first aspect of the present invention. This method includes mixing inorganic fibers A and inorganic fibers B and/or inorganic particles C that are melted at a temperature at which the inorganic fibers A are neither melted nor sublimated (i.e., the inorganic fibers B and/or inorganic particles C have a melting temperature which is lower than a melting temperature or a sublimating temperature of the inorganic fibers A); extrusion-molding the mixture obtained by mixing the inorganic fibers A and the inorganic fibers B and/or the inorganic particles C, by using a die with predetermined holes formed therein to form a pillar-shaped molded body with a number of cells formed in the longitudinal direction; and carrying out a heating treatment on the pillar-shaped molded body with a number of cells formed in the longitudinal direction at or below a temperature of the heat-resistant temperature of the inorganic fibers A, and at or above a temperature of the softening temperature of the inorganic fibers B and/or the inorganic particles C.

In the present specification, the method for manufacturing the honeycomb structure according to the embodiment of the second aspect of the present invention is also referred to simply as "manufacturing method through the extrusion-molding".

In the method for manufacturing a honeycomb structure according to the embodiment of the second aspect of the present invention, the mixture containing the inorganic fibers is extruded by using a die with predetermined holes formed therein so that a pillar-shaped molded body is formed, and by carrying out a heating treatment on this, a honeycomb structure that mainly includes inorganic fibers can be manufactured, with the inorganic fibers integrally formed therein, and has a low pressure loss, without the necessity of complex processes and expensive apparatuses.

Furthermore, by changing the shape of the die, honeycomb structures having various outer shapes and cell shapes can be manufactured.

The method for manufacturing the honeycomb structure according to the embodiment of the second aspect of the present invention preferably includes laminating lamination members for end portions mainly containing metal on each of the two end portions of the honeycomb structure.

In the method for manufacturing the honeycomb structure according to the embodiment of the second aspect of the present invention, since each of the two end portions of the honeycomb structure mainly including inorganic fibers which form the honeycomb structure without lamination interface are sealed by laminating the lamination members for end portions mainly containing metal, it is possible to manufacture a homogeneous honeycomb structure having a low pressure loss.

The method for manufacturing the honeycomb structure according to the embodiment of the third aspect of the present invention is a method for manufacturing a honeycomb structure according to the embodiment of the first aspect of the present invention. This method includes mixing inorganic fibers A, and inorganic fibers B and/or inorganic particles C that are melted at a temperature at which the inorganic fibers A are neither melted nor sublimated, as well as resin; installing vertically a plurality of pillar-shaped cores in a tube-shaped (cylindrical) container in a manner so as to make the long axis direction of the pillar-shaped cores used for forming cells in the honeycomb structure in parallel with the longitudinal direction of the tube-shaped (cylindrical) container that is filled in with the mixture obtained by mixing the inorganic fibers A, and the inorganic fibers B and/or the inorganic particles C, and the resin, as well as in a manner so as to form a lattice pattern in a plan view; filling the above-mentioned mixture into the tube-shaped (cylindrical) container in which the cores are vertically installed; curing the resin in the mixture filled into the tube-shaped (cylindrical) container to form a cured resin body; forming a pillar-shaped molded body in which a number of cells have been formed in the longitudinal direction, by removing the cores from the cured resin body; removing organic substances contained in the pillar-shaped molded body in which a number of cells have been formed in the longitudinal direction, by using a heat-degreasing operation; and carrying out a heating treatment of the molded body that has been degreased, at or below a temperature of the heat-resistant temperature of the inorganic fibers A, and at or above a temperature of the softening temperature of the inorganic fibers B and/or the inorganic particles C.

In the present specification, the method for manufacturing the honeycomb structure according to the embodiment of the third aspect of the present invention is also referred to simply as "manufacturing method by resin-curing (vertical installation of cores)."

Here, the core refers to a mold which, in forming a molded product (corresponding to the honeycomb structure in the present invention) having hollow (empty) portions (corresponding to cells in the present invention), is inserted to a portion to form each of the hollow (empty) portions.

In the method for manufacturing a honeycomb structure according to the embodiment of the third aspect of the present invention, the mixture, prepared by mixing inorganic fibers and resin, is filled into the container in which cores are installed vertically in a lattice pattern in a plan view, and after curing the resin, the cores and the resin are removed so that a pillar-shaped molded body is formed, and by carrying out a heating treatment on this, a honeycomb structure that mainly includes inorganic fibers can be manufactured, with the inorganic fibers integrally formed therein, and has a low pressure loss, without the necessity of complex processes and expensive apparatuses.

Furthermore, since the container and the shape of the cores can be easily changed, honeycomb structures with various outer shapes, not limited to a pillar shape, and cells having various shapes, such as those having a step difference inside the bottomed hole, can be manufactured.

The method for manufacturing the honeycomb structure according to the embodiment of the fourth aspect of the present invention is a method for manufacturing a honeycomb structure according to the first aspect of the present invention. This method includes mixing inorganic fibers A, and inorganic fibers B and/or inorganic particles C that are melted at a temperature at which the inorganic fibers A are neither melted nor sublimated, as well as resin; filling the mixture, obtained by mixing the inorganic fibers A, and the inorganic fibers B and/or the inorganic particles C, and the resin, into a frame member, which is formed by a bottom plate on which pillar members used for forming cells of the honeycomb structure are installed vertically to the main surface in a lattice pattern in a plan view and an outer frame formed so as to enclose the periphery of the bottom plate and the pillar member; curing the resin in the mixture filled in to form a cured resin body; removing the pillar members from the formed cured resin body and detaching the entire frame to form a pillar-shaped molded body in which a number of cells have been formed in the longitudinal direction; removing organic substances contained in the pillar-shaped molded body in which a number of cells have been formed in the longitudinal direction, by using a heat-degreasing operation; and carrying out a heating treatment of the molded body that has been degreased, at or below a temperature of the heat-resistant temperature of the inorganic fibers A, and at or above a temperature of the softening temperature of the inorganic fibers B and/or the inorganic particles C.

In the present specification, the method for manufacturing the honeycomb structure according to the embodiment of the fourth aspect of the present invention is also referred to simply as "manufacturing method through the resin-curing (metal molding)."

In the method for manufacturing a honeycomb structure according to the fourth aspect of the present invention, the mixture, prepared by mixing inorganic fibers and resin, is filled into the frame member in which pillar members are placed so as to stand in a lattice pattern in a plan view, and after curing the resin, the frame member is removed so that a pillar-shaped molded body is formed, and by carrying out a heating treatment on this, a honeycomb structure that mainly includes inorganic fibers, with the inorganic fibers integrally formed therein, and has a low pressure loss, can be manufactured without the necessity of complex processes and expensive apparatuses.

Furthermore, by changing the shapes of the pillar members and the outer frame, honeycomb structures having various outer shapes and cell shapes can be manufactured.

The method for manufacturing the honeycomb structure according to the embodiment of the fifth aspect of the present invention is a method for manufacturing a honeycomb structure according to the embodiment of the first aspect of the present invention, and is performed by using a vessel that includes a vessel main body; a mesh formed on the bottom portion of the vessel main body; pillar-shaped masks that are installed vertically on the mesh perpendicularly and in a lattice pattern in a plan view, and are used for forming cells of the honeycomb structure; and a liquid-filling cavity that forms each space surrounded by the pillar-shaped masks, with the mesh serving as the bottom face, into which the mixture is charged. This method includes mixing inorganic fibers A and inorganic fibers B and/or inorganic particles C that are melted at a temperature at which the inorganic fibers A are neither melted nor sublimated; charging the mixture obtained by mixing the inorganic fibers A and the inorganic fibers B and/or the inorganic particles C, into the liquid-filling cavity; discharging moisture from the mixture through the mesh so that a dehydrated body is formed; removing the pillar-shaped masks from the dehydrated body to form a pillar-shaped molded body having a number of cells formed in the longitudinal direction; and carrying out a heating treatment of the pillar-shaped molded body in which a number of cells have been formed in the longitudinal direction, at a temperature equal to or lower than the heat-resistant temperature of the inorganic fibers A, and at a temperature equal to or higher than the softening temperature of the inorganic fibers B and/or the inorganic particles C.

In the present specification, the method for manufacturing the honeycomb structure according to the embodiment of the fifth aspect of the present invention is also referred to simply as "manufacturing method through the three-dimensional sheet-forming process."

In the method for manufacturing a honeycomb structure according to the embodiment of the fifth aspect of the present invention, the mixture, prepared by mixing the inorganic fibers and inorganic fibers and/or inorganic particles, is filled into a vessel that includes a mesh on a bottom face and pillar-shaped masks that are installed vertically to the bottom face mesh perpendicularly to the mesh, in a lattice pattern in a plan view. The moisture in the mixture is drained through the mesh so that a pillar-shaped molded body including the inorganic fibers is formed. By carrying out a heating treatment on this, a honeycomb structure that mainly includes inorganic fibers, with the inorganic fibers integrally formed therein, and has a low pressure loss, can be manufactured without the necessity of complex processes and expensive apparatuses.

Referring to the drawings, the following description will discuss the honeycomb structure according to the embodiment of the first aspect of the present invention and the honeycomb filter with either one of the ends of each of the cells in the honeycomb structure being sealed according to the embodiment of the first aspect of the present invention.

Figure 2A:
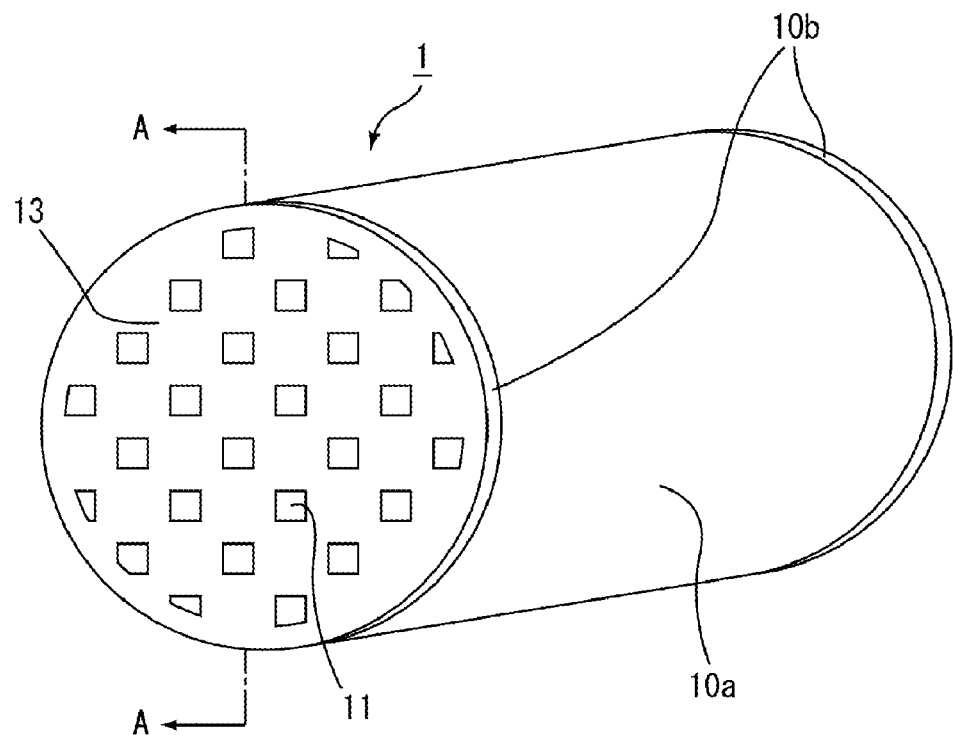
FIG. 2A is a perspective view that schematically illustrates one specific example of a honeycomb filter in which lamination members for end portions are laminated on each of the two end portions of a honeycomb structure according to one embodiment of the first aspect of the present invention.
Figure 2B:
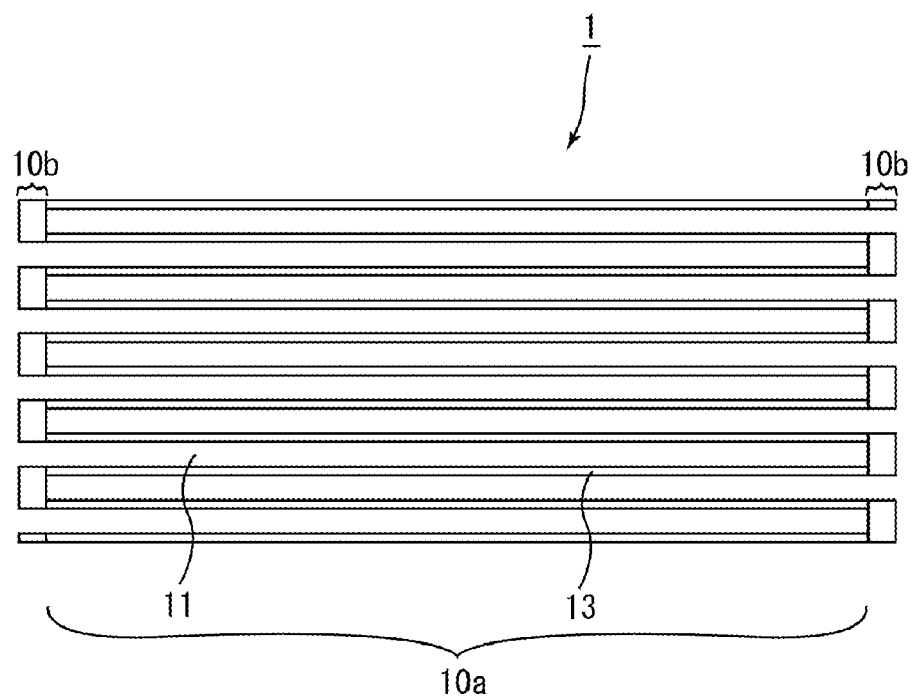
FIG. 2B is an A-A line cross-sectional view of FIG. 2A.

FIG. 2A is a perspective view that schematically illustrates one specific example of a honeycomb filter in which lamination members for end portions are laminated on each of the two end portions of the honeycomb structure according to the embodiment of the first aspect of the present invention, and FIG. 2B is an A-A line cross-sectional view of FIG. 2A.

A cylindrical honeycomb filter 1 is formed by laminating lamination members for end portions 10*b* on each of the two end portions of a honeycomb structure 10*a*.

The honeycomb structure 10*a* mainly includes inorganic fibers, with the inorganic fibers integrally formed therein, and has a number of cells 11 that are separated by a wall portion (cell wall) 13, and each of the cells 11 penetrates from one of the ends to the other end of the honeycomb structure 10*a*.

Either one of the ends of each of the cells is sealed by the lamination member for an end portion 10*b*. Here, the lamination member for an end portion will be described later.

As illustrated in FIG. 2B, the cell 11 has either one of its ends corresponding to the inlet side or the outlet side of exhaust gases sealed, so that exhaust gases, introduced into one cell 11, are allowed to flow out from another cell 11, after always having passed through the wall portion 13 separating the cells 11; thus, the wall portion 13 is allowed to function as a filter.

In the conventional lamination type honeycomb filter 100 (see FIG. 1A) formed by laminating a number of lamination members 110a including inorganic fiber aggregated bodies, there are lamination interfaces (see FIG. 1C) in which inorganic fibers are densely distributed; in contrast, since the honeycomb structure according to the embodiment of the first aspect of the present invention is not formed by lamination, lamination interfaces do not exist therein.

The above-mentioned lamination interfaces having inorganic fibers densely distributed make it difficult for exhaust gases to pass therethrough to cause an increase in pressure loss; however, the honeycomb structure according to the embodiment of the first aspect of the present invention having no lamination interfaces tends to allow exhaust gases to easily pass therethrough, and tends to be free from an increase in the pressure loss, therefore, a honeycomb structure having a low pressure loss can be manufactured. By manufacturing a honeycomb filter by using this, the resulting honeycomb filter can also have a low pressure loss.

Moreover, since the honeycomb structure according to the embodiment of the first aspect of the present invention mainly includes inorganic fibers, the honeycomb structure tends to be allowed to have a high porosity. The high porosity may make it easier to lower the pressure loss, and tends to allow PMs to enter the inside of the wall; since the possibility of PMs coming into contact with the catalyst supported on the inside of the wall tends to become higher, it may become easier to reduce energy required for burning PMs to a low level.

Since the honeycomb structure that includes inorganic fibers having a high porosity integrally formed therein has a small heat capacity, it tends to be quickly heated up to an active temperature of the catalyst by exhaust heat generated by the internal combustion engine. In particular, when placed right under the engine as a honeycomb filter so as to effectively utilize the exhaust heat, the effect is advantageously obtained.

The vertical cross-sectional shape of the honeycomb structure and the honeycomb filter is not limited to a round shape, and various shapes such as a rectangular shape may be used; however, it is preferable to use a shape enclosed only by a curved line or by curved lines and straight lines.

In addition to a round shape, specific examples thereof include an elliptical shape, an elongated round shape (racetrack shape), a shape in which one portion of a simple closed curved line such as an elliptical shape or a racetrack shape has a recess portion (concave shape), and the like.

The honeycomb structure according to the embodiment of the first aspect of the present invention, mainly including inorganic fibers, is formed by these inorganic fibers and an inorganic material, with the inorganic fibers being firmly fixed to one another through the inorganic material.

Here, preferably, the portions at which the inorganic fibers are firmly fixed to one another are mainly located at an intersection of the inorganic fibers or in the vicinity thereof so that the inorganic material is locally located at the intersection of the inorganic fibers or in the vicinity thereof.

The fixed state at an intersection or in the vicinity thereof refers to a state in which the inorganic fibers are firmly fixed to one another through the inorganic material that is locally located (present) at the intersection of the inorganic fibers (with or without mutual contacts among the inorganic fibers), a state in which the inorganic fibers are firmly fixed to one another through the inorganic material that is locally located (present) in the vicinity of the intersection of the inorganic fibers, or a state in which the inorganic fibers are firmly fixed to one another through the inorganic material that is locally located (present) over the entire area including the intersection of the inorganic fibers and the vicinity thereof.

Moreover, the inorganic material is preferably melted and solidified so as to fix the intersection of the inorganic fibers or the vicinity thereof.

Referring to the drawings, the following description will discuss this arrangement.

Figure 3:
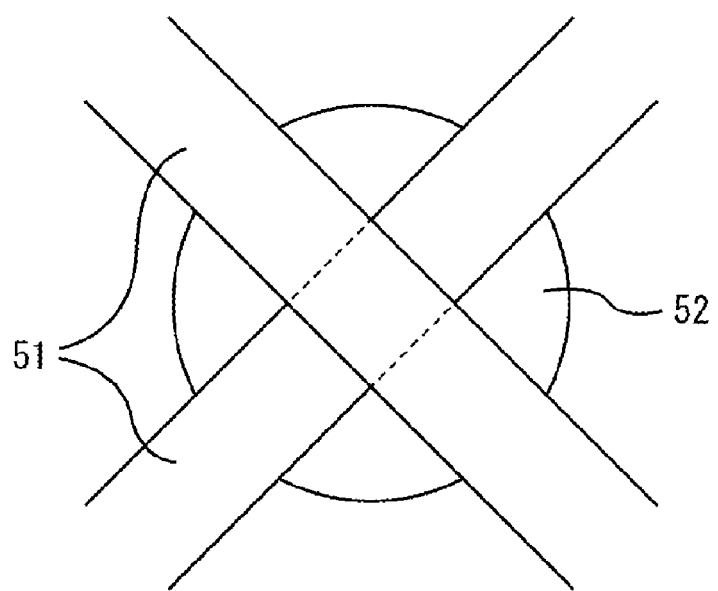
FIG. 3 is a cross-sectional view that schematically illustrates one portion of inorganic fibers that form the honeycomb structure according to one embodiment of the first aspect of the present invention.

FIG. 3 is a cross-sectional view that schematically illustrates one portion of the inorganic fibers that form the honeycomb structure according to the embodiment of the first aspect of the present invention. Here, the cross-sectional view of FIG. 3 illustrates a cross section in which crossing inorganic fibers are cut in the length direction.

The honeycomb structure according to the embodiment of the first aspect of the present invention, mainly including inorganic fibers, is formed by these inorganic fibers and an inorganic material, with the inorganic fibers being firmly fixed to one another through the inorganic material. Although not particularly limited, the fixed state is preferably formed so that the portions at which the inorganic fibers are firmly fixed to one another are located at an intersection of the inorganic fibers or in the vicinity thereof, with the inorganic material being locally located at the intersection of the inorganic fibers or in the vicinity thereof.

In the case where, as illustrated in FIG. 3, the inorganic material 52 is firmly fixed at the intersection between the inorganic fibers 51 forming a honeycomb structure according to the embodiment of the first aspect of the present invention or in the vicinity thereof, the inorganic material 52, firmly fixed on a intersection or in the vicinity thereof, serves so as to simultaneously couple two of the inorganic fibers to each other at the intersection or in the vicinity thereof. With respect to the fixed portion, not only one fixed portion, but also two or more fixed portions are present on one inorganic fiber, with the result that many inorganic fibers are entangled with one another in a complex manner; thus, it may become easier to prevent untangled inorganic fibers. Moreover, it may become easier to improve the strength of the honeycomb structure.

In the case where the inorganic material 52 is locally located at the intersection of the inorganic fibers 51 or in the vicinity thereof, many of the inorganic fibers 51 are coated with the inorganic material 52 at the intersection of other inorganic fibers 51 or in the vicinity thereof, with the inorganic material being hardly fixed to the other portions.

In this case, the mutual intersection between the inorganic fibers or the vicinity thereof refers to an area within a distance of approximately ten times the fiber diameter of the inorganic fibers from the point at which the inorganic fibers are in closest contact with each other.

Moreover, in the honeycomb structure according to the embodiment of the first aspect of the present invention, the inorganic material 52 is preferably melted and solidified to fix the intersection between the inorganic fibers or the vicinity thereof.

By allowing the inorganic material 52 to be melted and solidified to fix the inorganic fibers 51, the bond strength between the inorganic fibers serving as the basic constituent of the honeycomb structure according to the embodiment of the first aspect of the present invention becomes higher, making it possible to further prevent untangled inorganic fibers, and consequently it may become easier to further improve the strength of the honeycomb structure.

The tensile strength of the honeycomb structure is preferably set to about 0.3 MPa or more, more preferably, to about 0.4 MPa or more.

The tensile strength of about 0.3 MPa or more tends to provide sufficient reliability to a honeycomb filter using the above-mentioned honeycomb structure.

Here, the tensile strength can be measured by forming the honeycomb structure into a sheet shape, with the two ends thereof being fixed by jigs, and by measuring this by the use of an INSTRON type universal tensile meter.

In the above-mentioned honeycomb structure, the rate of the intersection of the inorganic fibers to which the inorganic material is firmly fixed or the vicinity thereof is preferably set to occupy about 20% or more of the entire intersection among the inorganic fibers or the entire vicinity thereof.

In the case where the rate of the intersection of the inorganic fibers to which the inorganic material is firmly fixed or the vicinity thereof is set to occupy about 20% or more of the entire intersection among the inorganic fibers or the entire vicinity thereof, insufficient strength in the honeycomb structure tends not to occur.

Here, with respect to the rate of the intersection of the inorganic fibers to which the inorganic material is firmly fixed or the vicinity thereof, the calculations are carried out in the following manner: a plurality of portions of the honeycomb structure are observed under a microscope, and within each of the observation views, the number of intersections of the inorganic fibers and the vicinities thereof, as well as the number of intersections of the inorganic fibers to which the inorganic material is firmly fixed and the vicinities thereof, is counted so that the rate is found, and the average value is calculated.

The honeycomb structure mainly includes inorganic fibers, and is also formed by these inorganic fibers and an inorganic material.

With respect to the material for inorganic fibers, examples thereof include: oxide ceramics such as silica-alumina, mullite, alumina, silica, titania and zirconia; nitride ceramics such as silicon nitride and boron nitride; carbide ceramics such as silicon carbide; basalt, and the like.

Each of these may be used alone or two or more kinds of these may be used in combination.

Among these, at least one kind selected from the group consisting of silicon carbide, alumina, basalt, silica, silica-alumina, titania and zirconia is preferably used.

This is because the honeycomb structure using these materials tends to exert a superior heat resistance.

With respect to the fiber length of the inorganic fibers, a preferable lower limit value is about 0.1 mm, and a preferable upper limit value is about 100 mm.

The fiber length of about 0.1 mm or more tends not to make it difficult to firmly fix the inorganic fibers to one another through an inorganic material, and it may become easier to provide sufficient strength. In contrast, the fiber length of about 100 mm or less tends not to make it difficult to manufacture a homogeneous honeycomb structure, and it may become easier to provide a honeycomb structure having sufficient strength.

A more preferable lower limit value of the fiber length is about 0.5 mm, and a more preferable upper limit value is about 50 mm.

With respect to the fiber diameter of the inorganic fibers, a preferable lower limit value is about 0.3 μm, and a preferable upper limit value is about 30 μm.

The fiber diameter of about 0.3 μm or more tends not to cause the inorganic fiber to be easily broken, with the result that the obtained honeycomb structure tends not to become vulnerable to wind erosion. In contrast, the fiber diameter of about 30 μm or less tends not to make it difficult for inorganic fibers to be firmly fixed to one another through an inorganic material, and it may become easier to provide sufficient strength. The lower limit value of the fiber diameter is more preferably set to about 0.5 μm, and the upper limit value thereof is more preferably set to about 15 μm.

With respect to the inorganic material, for example, those materials which are melted at a temperature at which the inorganic fibers are not melted or sublimated may be used. Moreover, those materials which are melted at a temperature less than the heat-resistant temperature of the inorganic fibers are preferably used as the inorganic material.

Here, taking the temperature at which the inorganic fibers to be combined are melted or sublimated, the heat resistance temperature of the inorganic fibers or the like into consideration, for example, those inorganic materials which are melted at or below a temperature of the heat-resistant temperature of the inorganic fibers may be used. More specifically, for example, in the case where alumina is used as the inorganic fibers, those inorganic materials which are melted at or below 1300° C. may be used.

With respect to the inorganic material, those containing silica are preferably used, and specific examples thereof include inorganic glass such as silicate glass, silicate alkali glass and borosilicate glass, and the like.

With respect to the apparent density of the honeycomb structure, a preferable lower limit value is set to about 0.04 $g/cm^3$ and a preferable upper limit value is set to about 0.4 $g/cm^3$.

The apparent density of about 0.04 $g/cm^3$ or more tends not to cause insufficient strength and consequently tends not to make the resulting product more vulnerable to damages. In addition, the apparent density of about 0.4 $g/cm^3$ or less is preferable since this level is suitable for continuously burning PMs. Here, in the present specification, the apparent density refers to a value obtained by dividing the mass (g) of a sample by the apparent volume ($cm^3$) of the sample, and the apparent volume refers to a volume including pores and apertures (cells) of the sample.

With respect to the porosity of the honeycomb structure according to the embodiment of the first aspect of the present invention, a preferable lower limit is about 75%, and a preferable upper limit is about 95%.

The porosity of about 75% or more tends to make it easier to raise the inner temperature of the filter to a temperature required for burning PMs in regenerating a filter, and also to make it easier for PMs to enter the inside of each pore, with the result that the continuous regenerating capability of the honeycomb structure tends not to be lowered. In contrast, the porosity of about 95% or less tends not to make the occupying rate of pores too high, so that it may become easier to properly maintain the strength of the entire honeycomb structure.

In addition, the average pore diameter of the honeycomb structure according to the embodiment of the first aspect of the present invention is not particularly limited, and the lower limit is preferably set to about 1 μm, and the upper limit is preferably set to about 100 μm. When the average pore diameter is about 1 μm or more, PMs tend to be filtered at the deep layers inside the cell walls, with the result that the PMs tend to be made in contact with the catalyst supported on the inside of the cell wall. On the other hand, when the average pore diameter is about 100 μm or less, PMs tend not to easily pass through the pores and thus the PMs tend to be captured sufficiently, it may become easier to surely function as a filter.

Here, the above-mentioned porosity and pore diameter can be measured through known methods, such as a mercury injection method using a mercury porosimeter, Archimedes method and a measuring method using a scanning electron microscope (SEM).

Moreover, in the honeycomb structure according to the embodiment of the first aspect of the present invention, the distance between adjacent cells (that is, the thickness of a cell wall) is preferably set to about 0.2 mm or more. The distance of about 0.2 mm or more tends not to cause degradation in the strength of the honeycomb structure.

Here, with respect to the distance between adjacent cells (the thickness of the cell wall), a preferable upper limit is set to about 5.0 mm. The thickness of the cell wall set to about 5.0 mm or less is not too thick, the aperture ratio and/or the filtration area of each cell tends not to become smaller, with the result that an increase in pressure loss tends not to occur. Moreover, ashes generated upon burning of PMs tend not to enter the pores deeply, making it easier to draw the ashes. Supposing that an area within which deep-layer filtering of PMs can be carried out is set as an effective area of a wall for soot capturing, the rate of the effective area relative to the honeycomb structure tends not to be lowered.

In the honeycomb structure according to the embodiment of the first aspect of the present invention, with respect to the cell density on a plane perpendicular to the longitudinal direction of the cells, not particularly limited, a preferable lower limit is set to about 0.16 pcs/cm2 (about 1.0 pcs/in2), and a preferable upper limit is set to about 93.0 pcs/cm2 (about 600.0 pcs/in2). A more preferable lower limit is set to about 0.62 pcs/cm2 (about 4.0 pcs/in2), and a more preferable upper limit is set to about 77.5 pcs/cm2 (about 500.0 pcs/in2).

Moreover, in the honeycomb structure according to the embodiment of the first aspect of the present invention, with respect to the size of a cell as a substantially square shape on a plane perpendicular to the longitudinal direction of the cells, not particularly limited, a preferable lower limit is set to about 0.8 mm×about 0.8 mm, and a preferable upper limit is set to about 16.0 mm×about 16.0 mm.

In the case where an uneven surface such as irregularities are formed on the inner surface of each of the cells forming the honeycomb structure according to the embodiment of the first aspect of the present invention, the filtration area is made larger so that in capturing PMs, presumably, the pressure loss tends to be further lowered. Moreover, the irregularities tend to allow the exhaust gas flow to form a turbulent flow, making it possible to reduce the temperature difference in the filter and consequently it may become easier to prevent damages due to thermal stress.

Here, the shape of the above-mentioned cell in a plan view is not particularly limited to a square shape, and any desired shape, such as a triangular shape, a hexagonal shape, an octagonal shape, a dodecagonal shape, a round shape, an elliptical shape and a star shape, may be used.

With respect to the preferable aperture ratio of the honeycomb structure according to the embodiment of the first aspect of the present invention, a lower limit is set to about 30%, and an upper limit is set to about 60%.

The aperture ratio of about 30% or more tends not to cause a high pressure loss when exhaust gases are allowed to flow in and out of the honeycomb structure, and the aperture ratio of about 60% or less tends not to cause a reduction in the strength of the honeycomb structure.

The honeycomb structure according to the embodiment of the first aspect of the present invention is preferably designed to have a heat-resistant temperature of about 1200° C. or more.

The heat-resistant temperature of about 1200° C. or more tends not to cause a breakage such as melting down in the honeycomb structure when a regenerating process is carried out especially in burning a large amount of PMs at one time.

The following description will discuss a lamination member for an end portion that is used for sealing one of the ends of each of the cells formed in the honeycomb structure according to the embodiment of the first aspect of the present invention.

Figure 4A:
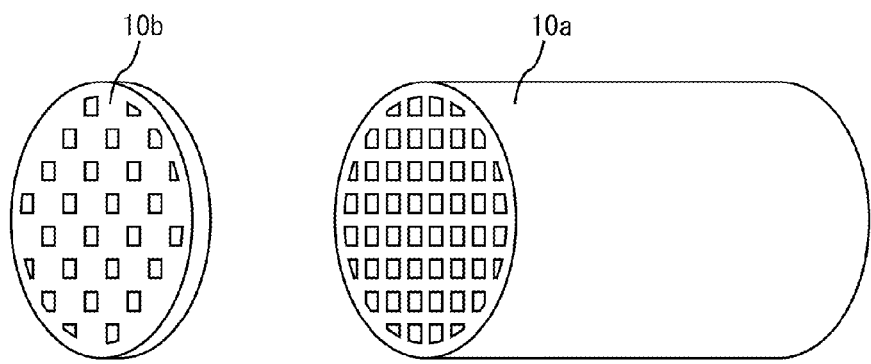
FIG. 4A is a perspective view that illustrates a honeycomb structure and a lamination member for an end portion according to one embodiment of the first aspect of the present invention.
Figure 4B:
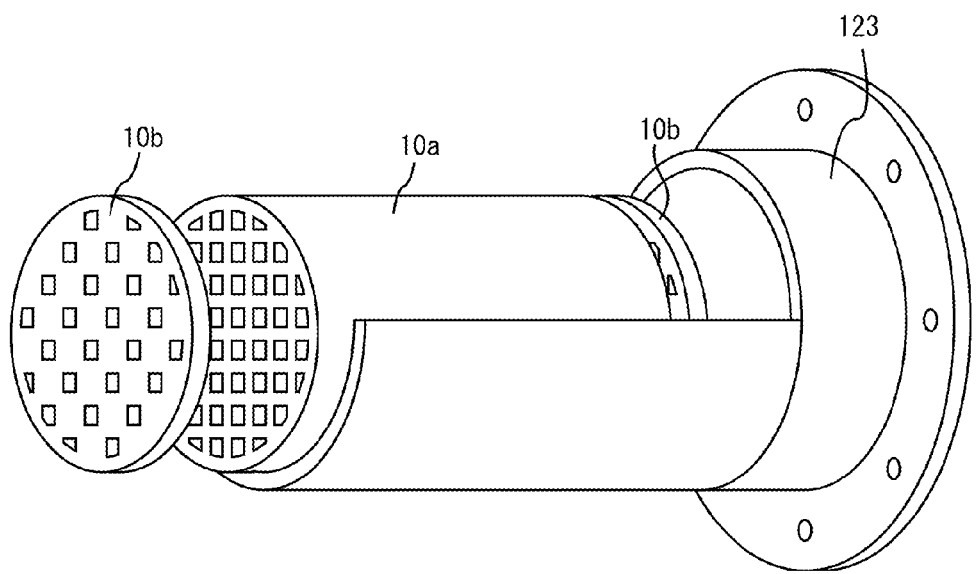
FIG. 4B is a perspective view that illustrates a state in which the honeycomb structure and the lamination member for an end portion, illustrated in FIG. 4A, are laminated so that a honeycomb filter is manufactured.

FIG. 4A is a perspective view that illustrates a honeycomb structure and a lamination member for an end portion according to the embodiment of the first aspect of the present invention, and FIG. 4B is a perspective view that illustrates a state in which by laminating the honeycomb structure and the lamination member for an end portion illustrated in FIG. 4A, a honeycomb filter is manufactured.

The honeycomb filter with either one of the ends of each of the cells in the honeycomb structure being sealed according to the embodiment of the first aspect of the present invention is preferably formed by laminating a lamination member for an end portion 10b with through holes formed in a checkered pattern on each of the two end portions of a honeycomb structure 10a.

By laminating the lamination member for an end portion, either one of the ends of each of the cells can be sealed without the necessity of sealing the end portion of the cell by using a plug member.

The lamination member for an end portion is preferably includes the same material as that of the honeycomb structure with through holes being formed in a checkered pattern, or a plate member including a dense material with through holes being formed in a checkered pattern.

Here, in the present specification, the dense material refers to a material having a porosity smaller than that of the material forming the lamination members, and specific examples thereof include metal, ceramics and the like.

When the plate member including a dense material is used as the lamination member for an end portion, it may become easier to make the lamination member for an end portion thinner.

With respect to the lamination member for an end portion, a material containing a solid metal (dense metal) is preferably used.

In addition, the application of a plate member including a dense material as the lamination member for an end portion tends to make it easier to prevent soot from leaking through the sealed portion.

Moreover, in the case where a plate member including a metal lamination member or a solid metal (dense metal), with through holes being formed in a checkered pattern, is laminated on each of the two end portions of the honeycomb structure, it may become easier to prevent wind erosion even after a long time use.

In the honeycomb structure according to the embodiment of the first aspect of the present invention, the following description will discuss a metal container in which a honeycomb structure with either one of the ends of each of the cells being sealed (honeycomb filter), or the honeycomb structure and the lamination member for an end portion mainly containing metal can be installed.

With respect to the metal container, specifically, a cylindrical casing 123 having a pressing metal member attached to one of the sides, as illustrated in FIG. 4B, may be used.

Here, FIG. 4B is a drawing that illustrates the casing 123, with the upper portion of its cylindrical portion forming the casing 123 being omitted, and the casing 123 has a cylindrical shape.

With respect to the material for the casing 123, examples thereof include, for example, metals such as stainless steel (SUS), aluminum and iron. Although the shape thereof is not particularly limited, it is preferable to use a shape that is similar to the outer shape of the honeycomb structure to be installed therein.

With respect to the specific installation method using the casing 123, a description will be given in the section of the method for manufacturing a honeycomb structure according to the embodiment of the second aspect of the present invention later.

The following description will discuss catalysts to be supported on the honeycomb structure according to the embodiment of the first aspect of the present invention.

It is preferable to support a catalyst on at least one portion of the inorganic fibers of the honeycomb structure according to the embodiment of the first aspect of the present invention. With respect to the kind of the catalyst, not particularly limited, an oxide catalyst containing at least $CeO_2$ is preferably used.

The above described oxide is not particularly limited as long as it can lower the burning temperature of particulates, and examples thereof include $CeO_2$, $ZrO_2$, $FeO_2$, $Fe_2O_3$, CuO, $CuO_2$, $Mn_2O_3$, MnO and composite oxides indicated by a composition formula $AnB1-nCO_3$, provided that in the formula, A is La, Nd, Sm, Eu, Gd or Y, B is an alkali metal or alkali-earth metal, and C is Mn, Co, Fe or Ni.

Each of these catalysts may be used alone, or two or more kinds of these may be used in combination; however, the catalyst preferably contains at least $CeO_2$.

By supporting such an oxide catalyst, the burning temperature of particulates tends to be lowered.

The amount of the supported catalyst is preferably set to at least about 10 g/l and at most about 200 g/l with respect to the apparent volume of the honeycomb structure.

The amount of the supported catalyst of about 10 g/l or more tends not to cause many portions of the wall portion of the honeycomb structure in which no catalyst is supported, with the result that a reduction in the possibility of PMs coming into contact with the catalyst tends not to occur, and it may become easier to sufficiently lower the burning temperature of PMs. In contrast, even when the amount thereof is more than about 200 g/l, the possibility of contact between PMs and the catalyst tends not to be improved so much, so that the amount of the supported catalyst is preferably set to about 200 g/l or less.

The method for manufacturing the honeycomb structure according to the embodiment of the first aspect of the present invention is not particularly limited, and various manufacturing methods may be used, and for example, any of the following methods for manufacturing the honeycomb structure according to the embodiments of the second to fifth aspects of the present invention may be used.

Figure 1B:
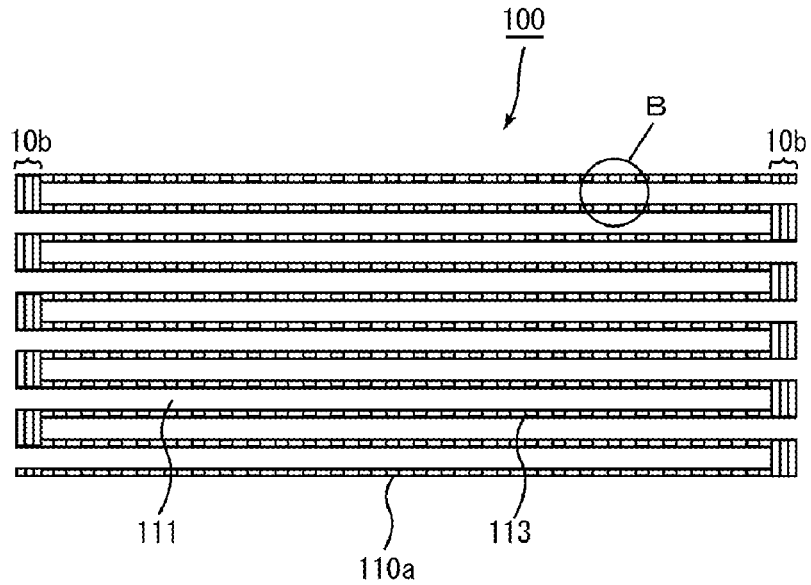
FIG. 1B is an A-A line cross-sectional view of FIG. 1A.
Figure 1C:
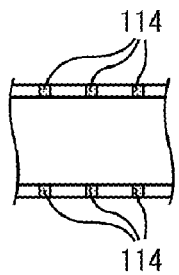
FIG. 1C is an enlarged cross-sectional view of a portion indicated by B in FIG. 1B.

Here, in FIGS. 1A and 1B, each of the lamination members 110a that includes inorganic fiber aggregate bodies and forms the honeycomb filter 100 is manufactured by producing, by a sheet-forming process, a slurry prepared by adding a sufficient amount of water to inorganic fibers, an organic binder, an inorganic binder and the like by using a mesh. In the case where the slurry is produced by the sheet-forming process into the lamination member 110a, inorganic fibers tend to be distributed on the surface portion of the lamination member 110a more densely in comparison with the inner portion thereof.

Moreover, in the case where the lamination members 110a are laminated with a pressure applied thereto so that a honeycomb filter is formed, since the surface portions, which have inorganic fibers more densely distributed of the lamination members 110a, are made adjacent with each other and compressed, the inorganic fibers tend to be more densely distributed on each lamination interface 114 (see FIG. 1C) that forms each border portion of the lamination members 110a, in comparison with the other portions.

Here, it is more difficult to allow exhaust gases to pass through portions in which the inorganic fibers are densely distributed than to allow them to pass through the other portions; consequently, when such a lamination interface in which inorganic fibers are densely distributed is formed, the pressure loss in the entire honeycomb filter tends to be increased.

The honeycomb filter including inorganic fiber aggregated bodies has a pressure loss lower than that of the honeycomb filter including ceramics; however, when there is a portion with inorganic fibers densely distributed, exhaust gases are allowed to preferentially flow through a portion with inorganic fibers sparsely distributed, with the result that it may become difficult to use the entire wall effectively, sometimes it may become difficult to reduce the PM burning energy to a low level. Therefore, in an attempt to manufacture a honeycomb filter by using inorganic fibers, there have been strong demands for methods for preparing a honeycomb filter that is more homogeneous, and has a lower pressure loss.

In the honeycomb structure according to the embodiment of the first aspect of the present invention, in the case where a honeycomb structure mainly including inorganic fibers, with the inorganic fibers integrally formed, is manufactured, since no portions in which the inorganic fibers are comparatively densely distributed exist in the inside of the honeycomb structure because there are no lamination interfaces in the honeycomb structure, and since an increase in the pressure loss, caused by the existence of the above-mentioned portions, tends not to occur, it may become easier to manufacture a honeycomb structure having a low pressure loss.

Moreover, a honeycomb filter with either one of the ends of each of the cells in the honeycomb structure being sealed according to the embodiment of the first aspect of the present invention, which is prepared by sealing either one of the ends of each of the cells in the honeycomb structure, tends to be a honeycomb filter having a low pressure loss.

The following description will discuss the above-mentioned method for manufacturing the honeycomb structure according to the embodiment of the second aspect of the present invention in the order of processes.

First, the mixing process is carried out so that a mixture is prepared by mixing inorganic fibers A and inorganic fibers B and/or inorganic particles C that are melted at a temperature at which the inorganic fibers A are neither melted nor sublimated.

With respect to the inorganic fibers A, the same inorganic fibers as those listed in the description of the honeycomb structure according to the embodiment of the first aspect of the present invention may be used, and at least one kind selected from the group consisting of silicon carbide, alumina, basalt, silica, silica-alumina, titania and zirconia is preferably used.

This is because it may become easier to manufacture a honeycomb structure having a superior heat resistance.

The inorganic fibers B and/or the inorganic particles C are not particularly limited as long as they are melted at a temperature at which the above-mentioned inorganic fibers A are not melted. The inorganic fibers B and/or the inorganic particles C preferably include silica, and specific examples of the inorganic fibers B include inorganic glass fibers containing glass such as silicate glass, silicate alkali glass and borosilicate glass, and the like, and specific examples of the inorganic particles C include inorganic glass particles containing glass such as silicate glass, silicate alkali glass and borosilicate glass, and the like.

Moreover, with respect to the inorganic fibers B and/or the inorganic particles C, those which are melted at or below a temperature of the heat-resistant temperature of the inorganic fibers A are preferably used. These inorganic fibers B and/or the organic particles C are softened in the below-described heat treatment process to form inorganic materials in the honeycomb structure according to the embodiment of the first aspect of the present invention.

With respect to the fiber length of the inorganic fibers B, a preferable lower limit value is about 0.1 mm, and a preferable upper limit value is about 100 mm.

The fiber length of about 0.1 mm or more tends not to make it difficult to firmly fix the inorganic fibers A to one another by using an inorganic material, and it may become easier to provide sufficient strength; in contrast, the fiber length of about 100 mm or less tends not to make it difficult to uniformly disperse the mixture in preparation thereof, with the result that, in heating in the post process, there tends not to be a reduction in fixing portions at an intersection of the inorganic fibers A or in the vicinity thereof due to the failure to uniformly disperse the inorganic fibers B and/or the inorganic particles C.

A more preferable lower limit is about 0.5 mm, and a more preferable upper limit is about 50 mm.

With respect to the fiber diameter of the inorganic fibers B, a preferable lower limit value is about 0.3 μm, and a preferable upper limit value is about 30 μm.

The fiber diameter of about 0.3 μm or more tends not to make it difficult to mutually anchor the inorganic fibers A with one another by using the inorganic material, and it may become easier to provide sufficient strength. In contrast, the fiber diameter of about 30 μm or less tends not to cause a reduction in fixing portions at an intersection of the inorganic fibers A or in the vicinity thereof.

With respect to the particle size of the inorganic particles C, a preferable lower limit is about 1 μm, and a preferable upper limit is about 100 μm.

When the particle size is about 1 μm or more, a coagulant is not required, and it becomes easy to uniformly disperse the particles. In contrast, the particle size of about 100 μm or less makes it easy to uniformly disperse the mixture in preparation thereof, with the result that, upon heating in the post process, there is a reduction in fixing portions at an intersection of the inorganic fibers A or in the vicinity thereof due to the failure to uniformly disperse the inorganic fibers B and/or the inorganic particles C.

In mixing the inorganic fibers A and the inorganic fibers B and/or the inorganic particles C, the blending ratio (weight ratio) of the inorganic fibers A to the inorganic fibers B and/or the inorganic particles C preferably falls in the range of about 2:8 to about 8:2.

About 2:8 or more of the blending ratio of the inorganic fibers A tends not to cause the inorganic material to be easily firmly fixed in a manner so as to coat the entire surface of each inorganic fiber, with the result that insufficient flexibility in the resulting honeycomb structure tends not to occur. In contrast, about 8:2 or less of the blending ratio of the inorganic fibers A tends not to cause a reduction in the fixing portions between the inorganic fibers, with the result that insufficient flexibility in the resulting honeycomb structure tends not to occur.

Here, in preparation of the mixture, a liquid medium such as water, and a dispersant may be added thereto, if necessary, so as to uniformly mix the inorganic fibers A and the inorganic fibers B and/or the inorganic particles C. Moreover, an organic binder may be added thereto. The addition of the inorganic binder allows the inorganic fibers A and the inorganic fibers B and/or the inorganic particles C to be surely entangled so that, even prior to a firing process, the inorganic fibers B and/or the inorganic particles C are made to be hardly drawn from the inorganic fibers A; thus, it may become easier to more surely fix the inorganic fibers A to one another.

With respect to the organic binder, examples thereof include: an acrylic binder, ethyl cellulose, butyl cellosolve, polyvinyl alcohol and the like. One kind of these organic binders may be used, or two or more kinds of these may be used in combination. In addition, if necessary, a plasticizer, a lubricant, a molding auxiliary, a pore-forming agent and the like may be added thereto. With respect to the plasticizer and lubricant, those conventionally used may be applied.

The mixture, thus obtained, is preferably allowed to have such properties that the homogeneous composition is maintained for a long time and that the inorganic fibers and the like are prevented from precipitating, and the mixture is preferably allowed to have such viscosity that a predetermined shape can be maintained in the succeeding molding process.

Next, an extrusion-molding process is carried out on the mixture obtained in the above-mentioned mixing process. In this extrusion-molding process, it is continuously extruded by using a die with predetermined holes formed therein so that a pillar-shaped molded body with a number of cells formed in the longitudinal direction is formed.

The apparatus to be used in the present extrusion-molding process is not particularly limited, and for example, a single-axis screw-type extrusion-molding apparatus, a multi-axis screw-type extrusion-molding apparatus, a plunger-type molding machine and the like may be used.

Among these, in particular, the plunger-type molding machine is preferably used.

Although not limited by the following system, referring to the drawings, the following description will discuss a plunger-type molding machine to be used in the present process, and the application example thereof.

Figure 5:
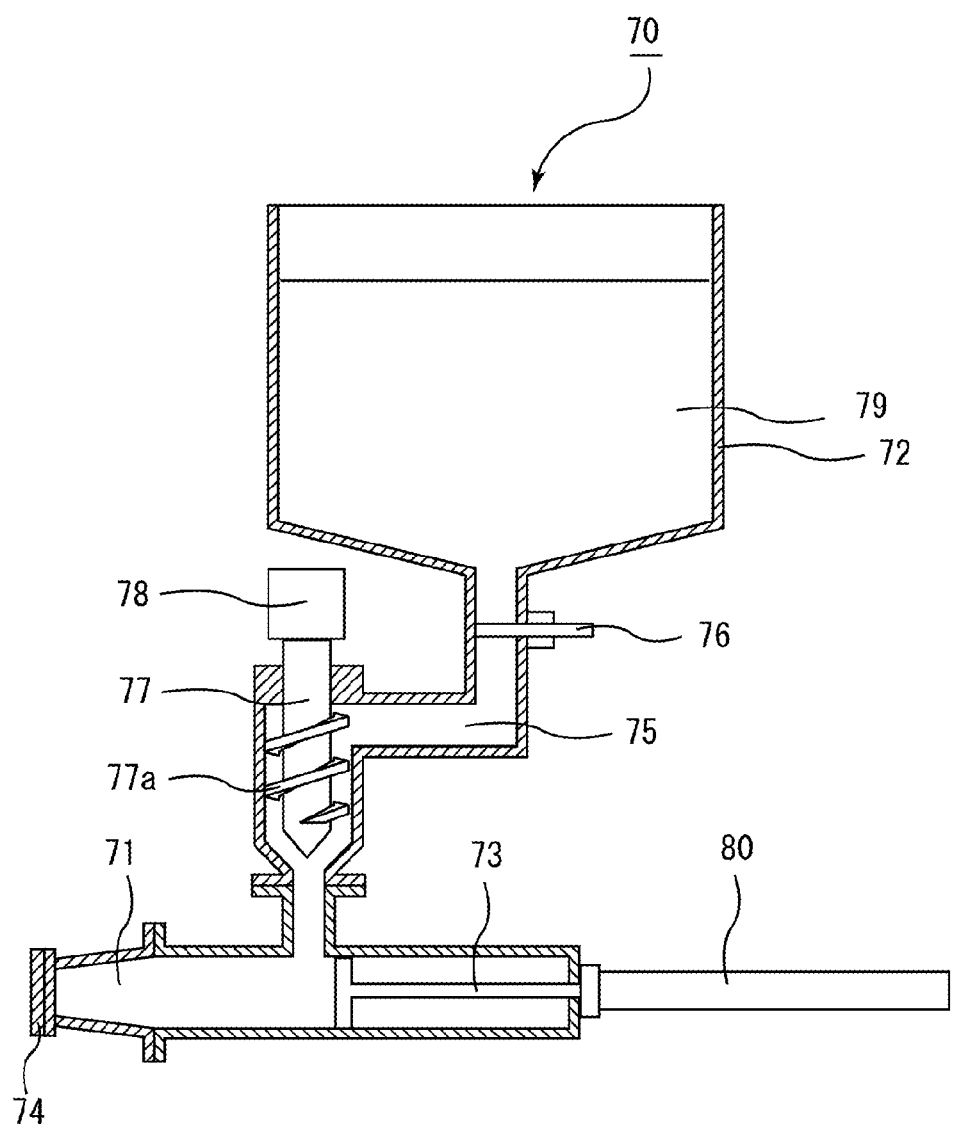
FIG. 5 is a cross-sectional view that schematically illustrates a plunger-type molding machine to be used for molding a pillar-shaped molded body.

FIG. 5 is a cross-sectional view that schematically illustrates a plunger-type molding machine to be used for molding a pillar-shaped molded body.

This plunger-type molding machine 70 is formed by a cylinder 71, a piston 73 provided with a mechanism capable of reciprocally moving between the front side and the rear side in the cylinder (horizontal direction in FIG. 5), a die 74 that is attached to the tip of the cylinder, and has holes formed therein so as to carry out an extrusion-molding process to form a pillar-shaped molded body with a number of cells formed in the longitudinal direction and a mixture tank 72, placed on the upper portion of the cylinder 71, to which a pipe 75 is connected from the cylinder 71. Moreover, a shutter 76 is placed right below the mixture tank 72 so that the charging operation of the mixture from the mixture tank 72 tends to be interrupted. Here, a screw 77 with blades 77a is attached to the pipe 75, and allowed to rotate by a motor 78. The size of the blade 77a is set to virtually the same as the diameter of the pipe so that the mixture 79 is hardly allowed to flow reversely. The mixture prepared in the above-mentioned mixing process is loaded into the mixture tank 72.

In manufacturing a molded body by using the plunger-type molding machine 70, first, the shutter 76 is opened, and the mixture, obtained in the mixing process, is charged into the cylinder 71 from the mixture tank 72 by rotating the screw. At this time, the piston 73 is moved to the end portion of the cylinder 71 on the right side in FIG. 5 according to the amount of the charge.

When the cylinder 71 is filled with the mixture, the shutter 76 is closed and the rotation of the screw 77 is simultaneously stopped. When the piston 73 is pressed and shoved into the die side with the inside of the cylinder 71 being filled with the mixture 79, the mixture is extruded through the die 74 so that a pillar-shaped molded body in which a plurality of cells are formed with a wall portion therebetween is continuously formed. At this time, according to the shape of the hole formed in the die, cells having the corresponding shape are formed. By repeating these processes, a molded body can be manufactured. Depending on the viscosity and the like, a molded body can be continuously manufactured, by rotating the screw 77 with the piston 73 being stopped. Here, in the plunger-type molding machine 70 illustrated in FIG. 5, an oil cylinder 80 is used as the driving source used for shifting the piston 73; however, an air cylinder may be used, or a ball screw or the like may also be used.

The shape of the cells to be formed through the extrusion-molding process can be desirably selected by changing the shape of holes to be formed in the die.

The shape on the vertical cross section of each of the cells is not particularly limited to a square shape, and any desired shape such as a triangular shape, a hexagonal shape, an octagonal shape, a dodecagonal shape, a round shape, an elliptical shape and a star shape may be used.

Moreover, honeycomb structures having various outer shapes can be manufactured by changing the shape of the die. The vertical cross-sectional shape of the honeycomb structure is not limited to a round shape, and various shapes such as a rectangular shape may be used; however, it is preferable to use a shape enclosed only by a curved line or by curved lines and straight lines, and in addition to a round shape, specific examples thereof include an elliptical shape, an elongated round shape (racetrack shape), a shape in which one portion of a simple closed curved line such as an elliptical shape or a racetrack shape has a recess portion (concave shape), and the like.

Next, a heating treatment process is carried out on the molded body obtained in the above-mentioned extrusion-molding process. In this heating treatment process, it is heated at a temperature of the heat-resistant temperature of the inorganic fibers A or less and the softening temperature of the inorganic fibers B and/or the inorganic particles C or more; thus, a honeycomb structure, mainly including inorganic fibers, with the inorganic fibers being integrally formed, can be obtained.

By carrying out this heating treatment, a honeycomb structure tends to be manufactured in which the inorganic fibers A are firmly fixed to one another through an inorganic material including the same material as the inorganic fibers B and/or the inorganic particles C, and most of the firmly fixed portions are placed near the intersection of the inorganic fibers A or in the vicinity thereof, with the inorganic material including the same material as the inorganic fibers B and/or the inorganic particles C being locally placed near the intersection or in the vicinity thereof.

Here, the heating temperature is appropriately determined by taking into consideration the combination of the inorganic fibers A and the inorganic fibers B and/or the inorganic particles C.

Examples of the heat-resistant temperature of the inorganic fibers A are given as follows: alumina >about 1300° C., silica >about 1000° C., silicon carbide >about 1600° C., and silica-alumina >about 1200° C.

The specific heating temperature is not unconditionally determined because it depends on the heat-resistant temperature and softening temperature of the inorganic fibers and the inorganic particles, and it is preferably set to at least about 900° C. and at most about 1050° C. in the case where inorganic glass is used as the inorganic fibers B and/or the inorganic particles C.

This temperature range is set because the heating temperature of about 900° C. or more tends to firmly fix an inorganic material to a certain portion of the surface of the inorganic fibers A, so that the inorganic fibers are firmly fixed to one another, and because the heating temperature of about 1050° C. or less tends not to cause cracks on the fixed inorganic material.

Additionally, prior to the heating treatment process, it is preferable to carry out a cutting process for cutting the extruded molded body into a predetermined length, a drying process for removing moisture from the molded body and a degreasing process for removing inorganic materials from the molded body.

The cutting member to be used in the cutting process is not particularly limited, and for example, a cutter having a blade formed in the cutting portion, a laser beam, a linear member, or the like may be used. Moreover, a cutter that uses a rotary disc for cutting may also be used.

Moreover, another preferable cutting method is proposed in which to the end to which the molded body molded in the extrusion-molding process is transferred, a molded body cutting machine provided with a cutting tool such as a laser and a cutter is installed, and while the cutting tool is being transferred at a speed synchronous to the extruding speed of the molding body, the molded body is cut by the cutting tool.

By using the cutting apparatus having the above-mentioned mechanism, it may become easier to carry out the cutting process continuously, and consequently the mass productivity can be improved.

With respect to the drying apparatus used for the drying process, although not particularly limited, for example, a microwave heat drying apparatus, a hot-air drying apparatus, an infrared ray drying apparatus or the like may be used, and a plurality of these apparatuses may be used in combination.

For example, in the case of using a hot-air drying apparatus, the drying process is preferably carried out at a set temperature of at least about 100° C. and at most about 150° C. for at least about 5 minutes and at most about 60 minutes under the atmospheric condition. In this case, the arrangement is preferably made so that the hot air is directed to the molded body in parallel with the longitudinal direction thereof so as to allow the hot air to pass through the cells. By allowing the hot air to pass through the cells of the molded body, the drying process of the molded body can be carried out efficiently.

Normally, the degreasing process is preferably carried out in an oxidizing atmosphere such as normal atmosphere so as to oxidatively decompose the organic substances. With respect to the degreasing furnace, not particularly limited, a batch-type degreasing furnace may be used; however, in order to continuously carry out the process, a continuous furnace provided with a belt conveyor is preferably used. The degreasing process is preferably carried out by conducting a drying process at a set temperature of at least about 200° C. and at most about 600° C. under normal atmosphere for at least about 1 hour and at most about 5 hours.

In the method for manufacturing the honeycomb structure according to the embodiment of the second aspect of the present invention, an acid treatment may be carried out on the pillar-shaped molded body manufactured through the above-mentioned method.

By carrying out the acid treatment, the heat resistance of the molded body tends to be improved.

The acid treatment is carried out by immersing the molded body in a solution such as a hydrochloric acid solution and a sulfuric acid solution.

With respect to the conditions of the acid treatment, in the case where inorganic glass is used as the inorganic material, the concentration of the treatment solution is preferably set to at least about 1 mol/l and at most about 10 mol/l, the treating time is preferably set to at least about 0.5 hours and at most about 24 hours, and the treatment temperature is preferably set to at least about 70° C. and at most about 100° C.

By carrying out the acid treatment under these conditions, components other than silica are eluted so that the heat resistance of the molded body tends to be consequently improved.

The above-mentioned acid treatment process may be carried out during heating treatment processes. More specifically, the following processes are preferably carried out: a primary firing process is carried out at about 950° C. for about 5 hours, and the acid treatment is then carried out, and a heating treatment is again carried out at about 1050° C. for about 5 hours as a secondary firing process. These processes can further improve the heat resistance of the molded body.

Moreover, the method for manufacturing the honeycomb structure according to the embodiment of the second aspect of the present invention preferably includes a process used for supporting an oxide catalyst on the above-mentioned inorganic fibers.

In supporting the catalyst, an oxide catalyst may be preliminarily supported on inorganic fibers such as alumina fibers, which are constituent materials. By supporting the catalyst on the inorganic fibers prior to the molding process, the catalyst tends to be adhered thereto in a more uniformly dispersed state.

With respect to the kind of the oxide catalyst, the same catalysts as those supported on the honeycomb structure described earlier may be used.

With respect to the method for supporting the oxide catalyst on the inorganic fibers, for example, a method in which, after inorganic fibers have been immersed in a slurry containing the oxide catalyst, the resulting inorganic fibers are taken out and heated, and the like are proposed.

Another method, in which, after the above-mentioned pillar-shaped molded body has been produced through the above-mentioned processes, the pillar-shaped molded body is immersed in the slurry containing the oxide catalyst, and then taken out, so that the resulting molded body is heated, and the like are proposed.

In the method for manufacturing the honeycomb filter structure according to the embodiment of the second aspect of the present invention, by laminating the honeycomb structure and the lamination member for an end portion, a honeycomb structure which has cells with either one of the ends being sealed and functions as a filter (honeycomb filter) is manufactured.

More specifically, as illustrated in FIG. 4B, by using a tube-shaped (cylindrical) casing 123 (metal container) with a pressing metal member on one side, after a lamination member for an end portion 10b has been first laminated in the casing 123, a honeycomb structure 10a, manufactured through the above-mentioned processes, is installed. Lastly, the lamination member for an end portion 10b is laminated, and a pressing metal member is also attached and fixed thereto on the other side thereof so that the honeycomb structure on which processes up to a canning process are carried out is manufactured. With respect to the material for the casing, for example, metal materials such as stainless steel (SUS), aluminum and iron may be used. Although not particularly limited, the shape thereof is preferably a shape similar to the outer shape of the honeycomb structure to be housed.

With respect to the lamination member for an end portion, a lamination member for an end portion containing metal with predetermined through holes is preferably laminated. Thus, a honeycomb filter having a structure in which the lamination member for end portion mainly containing metal are laminated on each of the two end portions of the honeycomb structure can be manufactured.

With respect to the lamination member for an end portion, a lamination member for an end portion including inorganic fibers may be laminated, and the lamination member for an end portion including inorganic fibers may be manufactured through processes in which a honeycomb structure having cells formed in a checkered pattern is manufactured by changing the shape of a hole formed in a die in the above-mentioned extrusion-molding process, and the resulting honeycomb structure is thinly cut in the cutting process.

The method for manufacturing the lamination member for an end portion containing metal is described below.

First, a laser machining process or a punching process is carried out on a porous metal plate mainly containing metal having a thickness of at least about 0.1 mm and at most about 20 mm so that a lamination member for an end portion with through holes formed in a checkered pattern is manufactured.

Next, an oxide catalyst is supported on the lamination member for an end portion, if necessary.

Examples of the method for supporting an oxide catalyst include, for example, a method in which a lamination member for an end portion is immersed in a solution that contains about 10 g of CZ(nCeO2.mZrO2), about 1 l (liter) of ethanol, about 5 g of citric acid and an appropriate amount of pH adjusting agent for about 5 minutes, and a firing process is carried out at about 500° C. on the resulting product, and the like.

In this case, by repeating the above-mentioned immersing process and firing process, the amount of catalyst to be supported tends to be adjusted.

Here, the above-mentioned catalyst may be supported on one portion of the metal lamination member, or may be supported on the entire lamination member for an end portion.

Referring to the drawings, the following description will discuss the method for manufacturing a honeycomb structure according to the embodiment of the third aspect of the present invention.

Figure 6A:
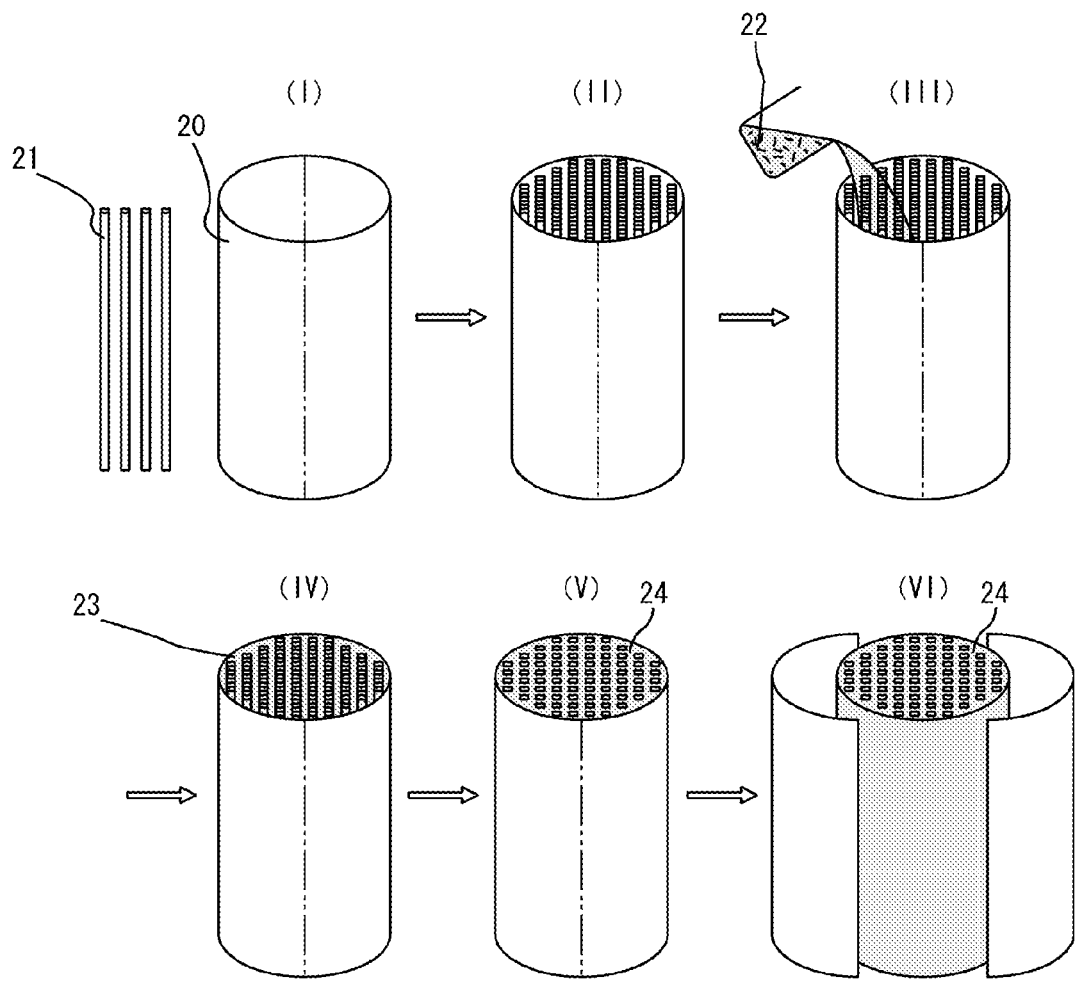
FIGS. 6A(I) to (VI) are drawings that schematically illustrate processes from a process of vertical installation of cores to a core removing process in manufacturing processes of a honeycomb structure according to one embodiment of the third aspect of the present invention.
Figure 6B:
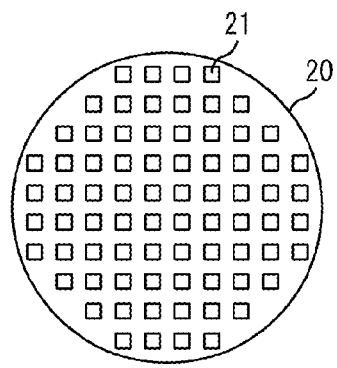
FIG. 6B is a top view that illustrates a state in which cores are installed vertically in a tube-shaped (cylindrical) container.
Figure 6C:
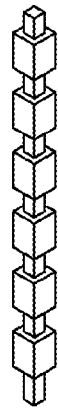
FIG. 6C is a perspective view that illustrates one example of a core having a step difference.

FIGS. 6A(I) to (VI) are drawings that schematically illustrate processes from the process of vertical installation of cores to the core removing process in the manufacturing processes of the honeycomb structure according to the embodiment of the third aspect of the present invention; FIG. 6B is a top view that illustrates a state in which the cores are installed vertically in the tube-shaped (cylindrical) container; and FIG. 6C is a perspective view that illustrates one example of the shape of a core having a step difference.

(1) First, prior to process (I) illustrated in FIG. 6A, the mixing process is carried out so that inorganic fibers A and inorganic fibers B and/or inorganic particles C that are melted at a temperature at which the inorganic fibers A are neither melted nor sublimated, are mixed with a thermosetting resin.

In the method for manufacturing a honeycomb structure according to the embodiment of the third aspect of the present invention, the inorganic fibers A, inorganic fibers B and inorganic particles C are the same as those used in the method for manufacturing the honeycomb structure according to the embodiment of the second aspect of the present invention; therefore, the description thereof is omitted, and in this case, resin is preferably added to the inorganic material. By curing the resin, a cured resin body can be formed, and the resin is removed in the succeeding degreasing process and a heat treatment is further carried out on the resulting body so that a honeycomb structure including inorganic fibers can be manufactured.

With respect to the above-mentioned resin, although not particularly limited, a thermosetting resin is preferably used. With respect to the kind of the thermosetting resin, although not particularly limited, for example, an epoxy resin, a phenol resin, a polyester resin, a urea resin, a melamine resin, or the like can be used. Among these, the epoxy resin is more preferably used because of its low shrinkage rate in curing.

Moreover, upon preparation of the mixture, by adding a solvent and a dispersant on demand, the inorganic fibers A and the inorganic fibers B and/or the inorganic particles C may be mixed uniformly.

(2) Next, the process of vertical installation of cores is carried out.

A tube-shaped (cylindrical) container 20 and a plurality of pillar-shaped cores 21 are prepared (see (I) in FIG. 6A), and the cores 21 are installed vertically in the tube-shaped (cylindrical) container 20 with their long axis direction being in parallel with the longitudinal direction of the tube-shaped (cylindrical) container 20 (see (II) of FIG. 6A).

In this case, as illustrated in FIG. 6B, the cores 21 are preferably arranged in a lattice pattern in a plan view. Here, with respect to the cores, in addition to core sand for use in casting that is desirably used, a resin material, low-melting-point metal, water-soluble salts on which a high-pressure press-molding process has been carried out, or the like may also be used.

(3) Next, the mixture-filling process is carried out.

The mixture 22, obtained in the mixing process, is poured into the tube-shaped (cylindrical) container 20 so that the tube-shaped (cylindrical) container is filled with the mixture (see (III) in FIG. 6A). In the case where the resin is cured by using a curing agent in the succeeding resin curing process, the curing agent is added to the mixture immediately before the filling process of the mixture, the mixture-filling process is then carried out.

The kind of the curing agent is determined according to the kind of the resin.

(4) Next, the resin-curing process is carried out.

With respect to the curing method of the resin, although not particularly limited, in the case where a curing agent has been added prior to the mixture-filling process, the resin is cured by the function of the curing agent so that a cured resin body 23 can be formed (see (IV) in FIG. 6A).

Moreover, in the case where a thermosetting resin is used without adding the curing agent, by heating the thermosetting resin to a temperature equal to or higher than the curing temperature of the thermosetting resin, the thermosetting resin can be cured, so that a cured resin body 23 is formed. The heating temperature should be determined depending on the kind of the thermosetting resin to be used, and it should be set to a temperature equal to or lower than the heat-resistant temperature of the cores. This arrangement is made because, when the cores are thermally deformed prior to the curing process of the thermosetting resin, it may become difficult to form cells having a desired shape.

(5) Next, the core removing process is carried out.

By removing the cores, cells are formed in portions that have been occupied by the cores, and these are allowed to form cells of the honeycomb structure (see (V) in FIG. 6A).

The method for removing the cores is not particularly limited, and for example, methods, such as a washing/elution method, a burning method, a thermal-fusing method, may be used, and an appropriate removing method can be used depending on the kind of the cores that have been installed vertically.

For example, when core sand and water-soluble salts on which a high-pressure press-molding process is carried out are used as the cores, the cores can be physically broken or warm water is swiftly thrown over the core portions so that the cores can be washed away or eluted.

Moreover, in the case where a resin material is used as the cores, by carrying out a firing process at a high temperature, the cores can be burned away. This firing process may be carried out in combination with the firing process to be carried out later.

Moreover, in the case where metal having a low-melting point is used as the cores, by heating the cores at a temperature equal to or higher than the melting point thereof, the cores can be thermally melted and allowed to come out.

In the method for manufacturing a honeycomb structure according to the embodiment of the third aspect of the present invention, the shape of cells to be formed can be designed into a desired shape by changing the shape of the cores.

Here, the shape on the vertical cross section of each of the cells is not particularly limited to a square shape, and any desired shape such as a triangular shape, a hexagonal shape, an octagonal shape, a dodecagonal shape, a round shape, an elliptical shape and a star shape may be used.

Here, in the case where a core having a step difference as illustrated in FIG. 6C is used, a cell having irregularities on the surface of its wall portion in the honeycomb structure can be formed. By forming the irregularities on the surface of its wall portion, it is possible to increase the filtration area, and consequently it may presumably become easier to reduce the pressure loss in capturing particulates. Moreover, the irregularities tend to allow the exhaust gas flow to form a turbulent flow, so that it may become easier to reduce the temperature difference in the filter and consequently to prevent damages such as cracks due to thermal stress.

By removing the tube-shaped (cylindrical) container before or after the core removing process, a pillar-shaped molded body 24 is formed (see (VI) of FIG. 6A).

Moreover, honeycomb structures having various outer shapes are manufactured by changing the shape of the tube-shaped (cylindrical) container. The vertical cross-sectional shape of the honeycomb structure is not limited to a round shape, and various shapes such as a rectangular shape may be used; however, it is preferable to use a shape enclosed only by a curved line or by curved lines and straight lines, and in addition to a round shape, specific examples thereof include an elliptical shape, an elongated round shape (racetrack shape), and a shape in which one portion of a simple closed curved line such as an elliptical shape or a racetrack shape has a recess portion (concave shape), and the like.

Next, the degreasing process for removing the resin from the molded body is carried out.

With respect to the specific method thereof, the detailed description will be omitted since the same process as the aforementioned degreasing process is carried out; thus, a degreased molded body can be obtained.

Thereafter, a honeycomb structure can be manufactured by using the same method as that used for manufacturing the honeycomb structure according to the embodiment of the second aspect of the present invention. Therefore, the specific description thereof will be omitted.

Referring to part of the drawings, the following description will discuss the above-mentioned method for manufacturing the honeycomb structure according to the embodiment of the fourth aspect of the present invention; however, since the method includes many processes that are the same as those of the aforementioned method for manufacturing a honeycomb structure according to the embodiment of the third aspect of the present invention, those processes that are different will be mainly described.

(1) First, the mixing process is carried out.

The present mixing process can be carried out in the same manner as in the method for manufacturing a honeycomb structure according to the embodiment of the third aspect of the present invention; therefore, the detailed description thereof is omitted.

Figure 7A:
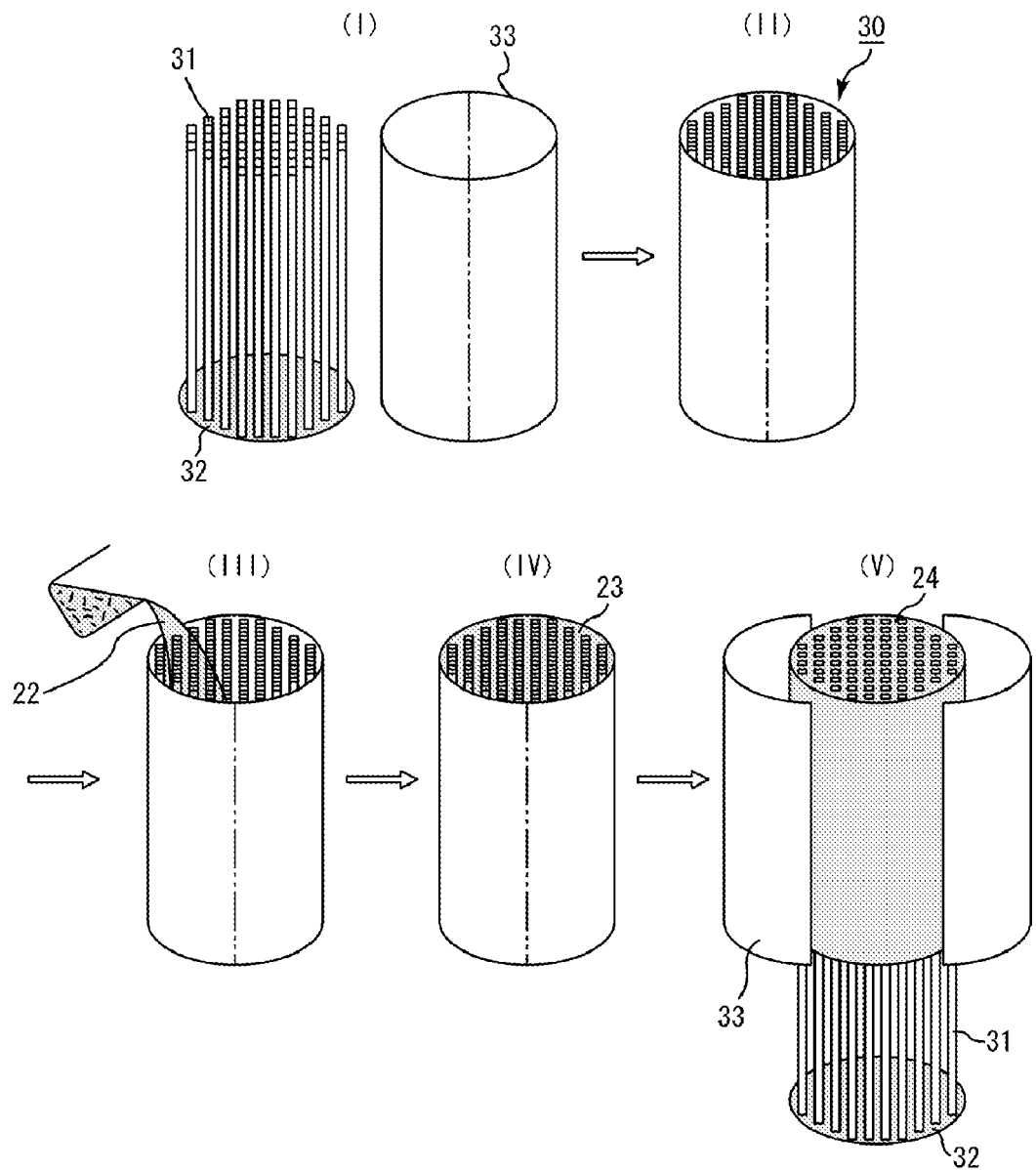
FIGS. 7A(I) to (V) are drawings that schematically illustrate processes from a mixture filling process to a frame member removing process in manufacturing processes of a honeycomb structure according to one embodiment of the fourth aspect of the present invention.
Figure 7B:
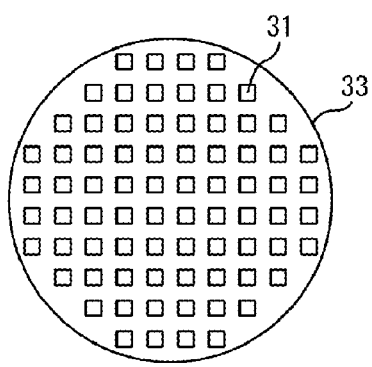
FIG. 7B is a top view that illustrates a state in which pillar members are installed vertically in the frame member.

FIGS. 7A(I) to (V) are drawings that schematically illustrate processes from the mixture-filling process to the frame member removing process, in the manufacturing processes of the honeycomb structure according to the embodiment of the fourth aspect of the present invention, and FIG. 7B is a top view that illustrates a state in which pillar members are installed vertically inside the frame member.

(2) Next, the mixture-filling process is carried out.

As the frame member to be filled in with the mixture, a frame member 30 (see (II) of FIG. 7A) is formed by a bottom plate 32 (see (I) in FIG. 7A and FIG. 7B) on which pillar members 31 used for forming cells of the honeycomb structure are installed vertically to the main surface in a lattice pattern in a plan view, and an outer frame 33 (see (I) of FIG. 7A) formed so as to enclose the periphery of the bottom plate 32 and the pillar members 31. The frame member may be integrally formed, or may be formed as parts that can be separated and combined.

The material for the respective parts forming the frame member is preferably prepared as metal. This is because, the frame member is allowed to have a high heat resistance so as to be suitable for a structure in which the curing process of resin is carried out by heating, and it may become easier to be separated from the cured resin body.

Next, the frame member 30 is filled in with a mixture 22 (see (III) of FIG. 7A). This process is carried out in the same manner as in the method for manufacturing a honeycomb structure according to the embodiment of the third aspect of the present invention except that the container to be filled in is different; therefore, the detailed description thereof is omitted.

(3) Next, the resin-curing process is carried out.

Since this resin-curing process is carried out in the same manner as in the method for manufacturing a honeycomb structure according to the embodiment of the third aspect of the present invention, the detailed description thereof is omitted (see (IV) of FIG. 7A).

(4) Next, the frame member removing process is carried out.

By removing the pillar members 31, cells are formed in portions that have been occupied by the pillar members, and these are allowed to form cells for the honeycomb structure (see (V) in FIG. 7A).

In this case, it is preferable to preliminarily form a draft angle of about 2° in each pillar member 31 so that the pillar members 31 can be easily drawn from the cured resin body 23.

Moreover, the outer frame 33 is separately detached so that a pillar-shaped molded body 24 is formed.

Here, the frame member can be used repeatedly.

In the same manner as in the method for manufacturing a honeycomb structure according to the embodiment of the third aspect of the present invention, by changing the shapes of the pillar members and the outer frame, honeycomb structures having various cell shapes and outer shapes can be manufactured.

Different from the method for manufacturing a honeycomb structure according to the embodiment of the third aspect of the present invention, however, it may become difficult to form cells with irregularities formed on the surface of each wall portion of the honeycomb structure.

Thereafter, by using the same method for manufacturing the honeycomb structure according to the embodiment of the third aspect of the present invention, a honeycomb structure can be manufactured. Therefore, the detailed description thereof will be omitted.

Referring to the drawings in some parts, the following description will discuss the method for manufacturing the honeycomb structure according to the embodiment of the fifth aspect of the present invention.

First, referring to the drawings, the vessel to be used in the method for manufacturing a honeycomb structure according to the embodiment of the fifth aspect of the present invention will be described. Here, the present invention is not limited to the method that uses the vessel of the kind described below, the description will be given as one example.

Figure 8A:
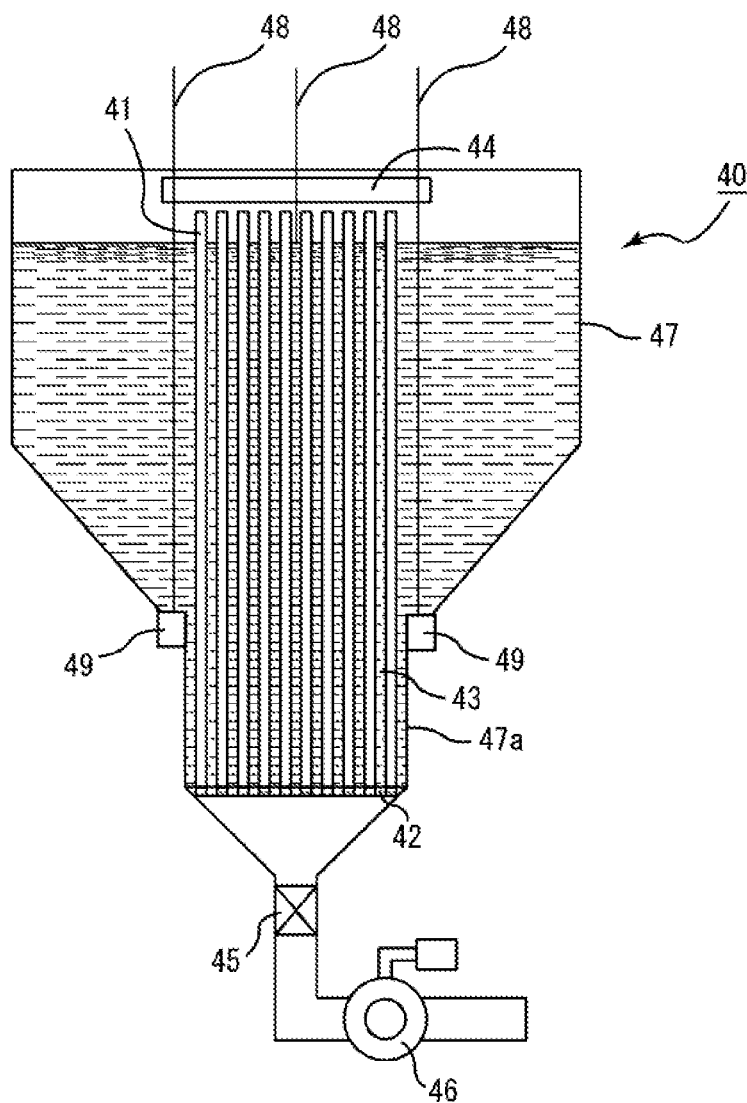
FIG. 8A is a drawing that schematically illustrates a vessel to be used in manufacturing processes for a honeycomb structure according to one embodiment of the fifth aspect of the present invention.
Figure 8B:
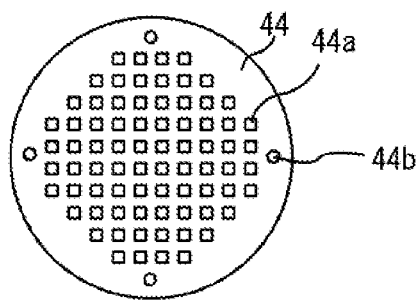
FIG. 8B is a top view that schematically illustrates a pressing plate to be used in a pressing process.

FIG. 8A is a drawing that schematically illustrates a vessel to be used in the manufacturing process for the honeycomb structure according to the embodiment of the fifth aspect of the present invention, and FIG. 8B is a top view that schematically illustrates a pressing plate to be used in a pressing process.

This vessel 40 is configured by a vessel main body 47; a mesh 42 formed on the bottom portion of the vessel main body; pillar-shaped masks 41 that are installed vertically to the mesh 42 and in a lattice pattern in a plan view, and are used for forming cells of the honeycomb structure; and a liquid-filling cavity 43 that forms each space surrounded by the pillar-shaped masks 41, with the mesh 42 serving as the bottom face, into which the mixture is charged.

Moreover, the vessel 40 may be provided with a pressing plate 44 with through holes 44a having a lattice pattern formed in portions corresponding to the pillar-shaped masks 41, a cock 45 and a pump 46 used for draining, a press driving cavity used for press-inserting the pressing plate 44 onto the vessel main body and a vibration cavity, not illustrated, used for giving vibration to the vessel main body.

In manufacturing a honeycomb structure by using the vessel 40 having the above-mentioned structure, the above-mentioned mixing process, mixture-filling process, dehydration process, mask-removing process and heating treatment process are carried out.

Moreover, a stirring process and/or a pressing process may be carried out on demand.

The following description will discuss the respective processes.

(1) First, the mixing process is carried out in which inorganic fibers A and inorganic fibers B and/or inorganic particles C that are melted at a temperature at which the inorganic fibers A are neither melted nor sublimated, as well as water, are mixed with one another.

In the method for manufacturing a honeycomb structure according to the embodiment of the fifth aspect of present invention, the inorganic fibers A, the inorganic fibers B and the inorganic particles C are the same as those used for the method for manufacturing the honeycomb structure according to the embodiment of the second aspect of the present invention; therefore, the detailed description thereof is omitted, and in this case, a large amount of water is preferably added to the inorganic material so as to lower the viscosity of the mixture to such a level as to be applicable to a sheet-forming process.

In preparation of the mixture, by adding a dispersant thereto, if necessary, the inorganic fibers A and the inorganic fibers B and/or the inorganic particles C may be mixed uniformly. Moreover, an organic binder may be added thereto. The addition of the inorganic binder allows the inorganic fibers A and the inorganic fibers B and/or the inorganic particles C to be surely entangled so that, even prior to a firing process, the inorganic fibers B and/or the inorganic particles C tend not to be drawn from the inorganic fibers A; thus, it may become easier to more surely fix the inorganic fibers A to one another.

Moreover, a pore-forming agent may be added thereto, if necessary.

(2) Next, the mixture-filling process in which the mixture, obtained in the mixing process, is charged into the liquid-filling cavity 43 is carried out. Here, the mixing process may be carried out in the vessel 40.

After the mixture-filling process, a stirring process may be carried out, in which the mixture filled into the liquid-filling cavity 43 is stirred. The stirring process may be carried out by activating a vibration unit, not illustrated, used for giving vibration to the vessel main body. With respect to the specific vibration unit, for example, an oscillator provided with an ultrasonic resonator, a vibrator and the like may be used, and the vibration unit may be installed on the side face of the vessel main body 47. This may also be installed in the vessel main body 47. The mixture tends to be uniformly stirred by this stirring process.

(3) Next, a dehydration process in which moisture in the mixture is sucked so that water in the mixture is drained through the mesh 42 is carried out.

In this case, the cock 45 placed on the lower side of the mesh 42 is opened, and the pump 46 is actuated. Thus, the mixture, filled into the liquid-filling cavity 43, is sucked and filtered, and allowed to drop through the mesh 42, and drained through the cock 45. Consequently, the water contained in the mixture has been dehydrated so that a dehydrated body having a predetermined height from the bottom portion of the liquid-filling cavity is formed.

After the dehydration process, the dehydrated body that has been dehydrated in the above-mentioned dehydration process may undergo a pressing process in which it is compressed by the pressing plate from the upper face. By carrying out the compressing process by applying a pressure thereto, a compressed body having a predetermined length, appropriate density and porosity, tends to be formed.

The apparatus and the method used for the pressing process are not particularly limited to those described below, and a vessel 40, illustrated in FIG. 8A, is provided with motors 49 and four ball screws 48 coupled to the motors 49 that serve as a press driving unit, and the four ball screws 48 are threaded with four screw holes 44b formed in a pressing plate 44; thus, the four ball screws 48 rotate in synchronism with one another so that the pressing plate 44 is raised and lowered.

Moreover, the pressing plate 44 is prepared as a plate, as illustrated in FIG. 8B, with through holes being formed in a lattice pattern in portions corresponding to the pillar masks 41.

When the four motors 49 are driven in synchronism with one another, the pressing plate 44 is lowered downward so that the dehydrated body is compressed in the portion corresponding to the lower portion 47a of the vessel main body to be formed into a compressed body. As illustrated in FIG. 8A, the lower portion 47a of the vessel main body has a shape corresponding to a honeycomb structure so that when the pressing plate 44 is lowered to a portion at which the motors 49 are placed, a compressed body having a cylindrical shape is formed.

Here, the lower portion 47a of the vessel main body has a cylindrical shape, and the dehydrated body is compressed by the pressing plate 44, and filled into the lower portion 47a of the vessel main body to be formed in the shape of the honeycomb structure. Therefore, by changing the shape of the lower portion 47a of the vessel main body, the shape of the honeycomb structure can be changed.

(4) Next, by removing the pillar-shaped masks from the dehydrated body, the mask-removing process is carried out to form a pillar-shaped molded body with a number of cells formed in the longitudinal direction. Thus, a pillar-shaped molded body having cells with a predetermined shape and predetermined length and density can be obtained.

The shape of each of the cells to be formed in the method for manufacturing a honeycomb structure according to the embodiment of the fifth aspect of the present invention can be formed in a desired shape by changing the shape of the pillar-shaped masks.

The shape on the vertical cross section of each of the cells is not particularly limited to a square shape, and any desired shape such as a triangular shape, a hexagonal shape, an octagonal shape, a dodecagonal shape, a round shape, an elliptical shape and a star shape may be used.

Moreover, honeycomb structures having various outer shapes can be manufactured by changing the shape of the vessel main body 47. The vertical cross-sectional shape of the honeycomb structure is not limited to a round shape, and various shapes such as a rectangular shape may be used; however, it is preferable to use a shape enclosed only by a curved line or by curved lines and straight lines, and in addition to a round shape, and specific examples thereof include an elliptical shape, an elongated round shape (racetrack shape) and a shape in which one portion of a simple closed curved line, such as an elliptical shape or a racetrack shape, has a recess portion (concave shape). By forming the shape of the vessel main body 47 in a plan view into the above-mentioned shape, a honeycomb structure having the above-mentioned shape in the cross-sectional shape perpendicular to the cells can be manufactured.

Thereafter, in the same manner as in the method for manufacturing the honeycomb structure according to the embodiments of the second to fourth aspects of the present invention, a honeycomb structure can be manufactured. Therefore, the detailed description thereof will be omitted.

The applications of the honeycomb structure according to the embodiment of the first aspect of the present invention and the honeycomb filter with either one of the ends of each of the cells in the honeycomb structure being sealed according to the embodiment of the first aspect of the present invention are not particularly limited, and for example, it may be used for an exhaust-gas purifying apparatus for vehicles.

Figure 9:
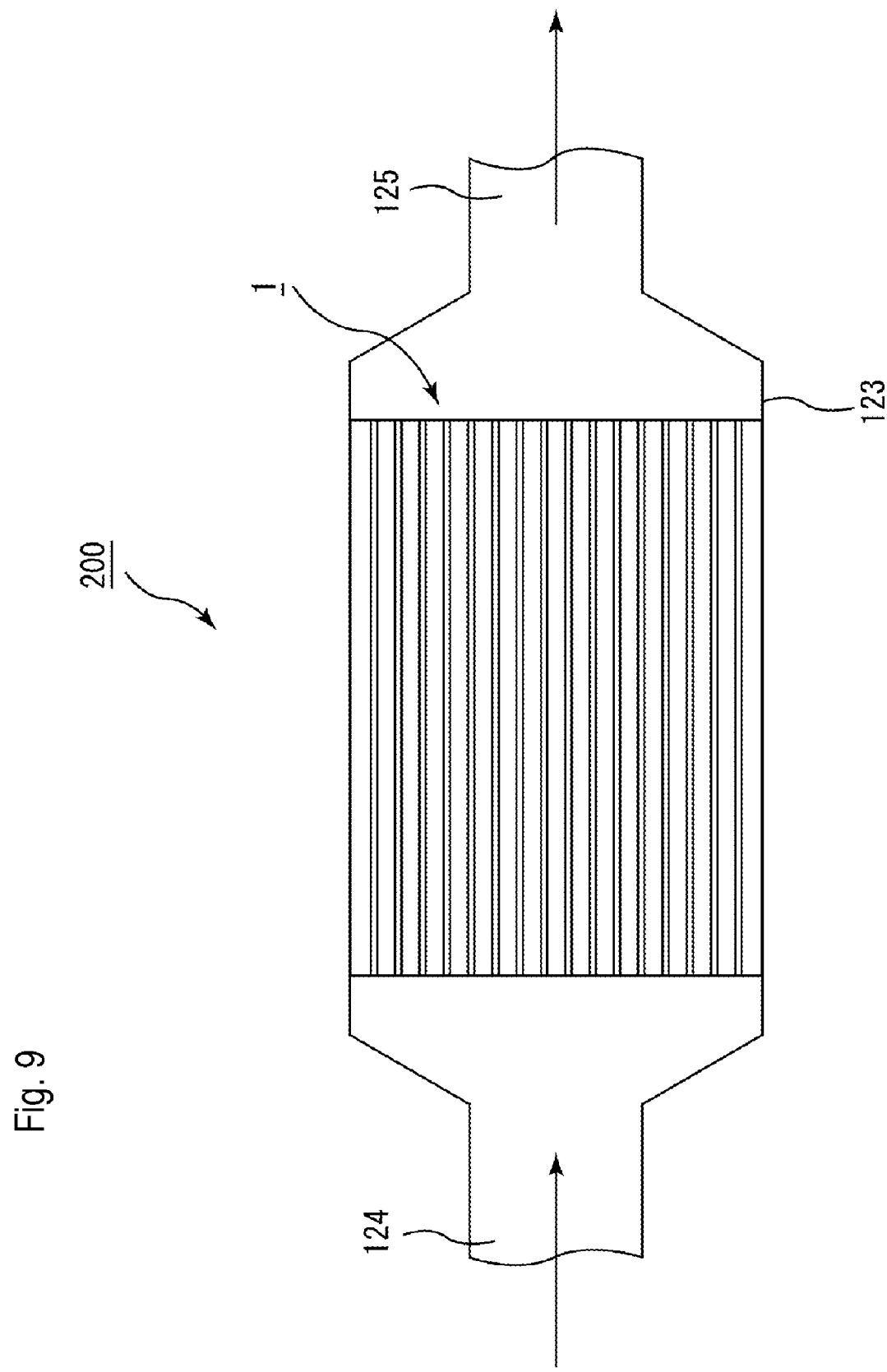
FIG. 9 is a cross-sectional view that schematically illustrates one example of an exhaust-gas purifying apparatus for a vehicle in which the honeycomb filter with either one of the ends of each of the cells in the honeycomb structure being sealed according to one embodiment of the first aspect of the present invention is installed.

FIG. 9 is a cross-sectional view that schematically illustrates one example of an exhaust-gas purifying apparatus for a vehicle in which the honeycomb filter with either one of the ends of each of the cells in the honeycomb structure being sealed according to the embodiment of the first aspect of the present invention is installed.

As illustrated in FIG. 9, an exhaust-gas purifying apparatus 200 has a structure in which: a casing 123 covers the outside of a honeycomb filter 1 with either one of the ends of each of the cells in the honeycomb structure being sealed according to the embodiment of the first aspect of the present invention, and an introducing pipe 124 coupled to an internal combustion engine such as an engine is connected to the end portion on the side of the casing 123 to which exhaust gases are introduced, and an exhaust pipe 125 coupled to the outside is connected to the other end portion of the casing 123. Here, arrows in FIG. 9 indicate flows of the exhaust gases.

In the exhaust-gas purifying apparatus 200 having the above-mentioned structure, exhaust gases discharged from the internal combustion engine such as an engine are introduced into the casing 123 through the introducing pipe 124, and allowed to pass through the wall portions (cell walls) of the honeycomb filter 1, and after particulates have been captured by the cell walls to purify the exhaust gases, the purified gases are discharged outside through the exhaust pipe 125.

After a large amount of particulates have been accumulated on the wall portions (cell walls) of the honeycomb filter 1 to cause a high pressure loss, a regenerating process is carried out on the honeycomb filter 1 by a predetermined method such as post-injection method so that the honeycomb filter 1 is regenerated.

The honeycomb filter with either one of the ends of each of the cells in the honeycomb structure being sealed according to the embodiment of the first aspect of the present invention has a high porosity, and tends to allow much PM into the walls. In comparison with a honeycomb filter having a low porosity, since the possibility of PMs coming into contact with the catalyst supported on the inside of the wall becomes higher, it may become easier to reduce energy required for burning PMs to a low level.

EXAMPLES

The following description will discuss the present invention in more detail by Examples; however, the present invention is not limited only to these Examples.

Example 1

By using an extrusion-molding process as the method for manufacturing the honeycomb structure, a honeycomb structure was manufactured.

(1) Mixing Process

First, 12.3 parts by weight of alumina fibers (average fiber length: 0.3 mm, average fiber diameter: 5 m) containing 72% of alumina and 28% of silica, 6.2 parts by weight of glass fibers (average fiber diameter: 9 μm, average fiber length: 3 mm), 11.7 parts by weight of an organic binder (methyl cellulose), 7.1 parts by weight of a pore-forming agent (acryl), 8.1 parts by weight of a plasticizer (UNILUB, made by NOF Corporation), 3.8 parts by weight of a lubricant (glycerin) and 50.9 parts by weight of water were mixed, and sufficiently stirred to prepare a mixture.

(2) Extrusion-molding Process

The mixture, obtained in process (1), was charged into a cylinder from a mixture tank of a plunger-type extrusion-molding apparatus, and the piston is pressed toward the die side so that the mixture was extruded through the die to manufacture a cylindrical molded body (diameter of circle: 160 mm) with cells, each having a size of 4.5 mm×4.5 mm, being formed with intervals of 2 mm in the longitudinal direction.

(3) Cutting Process

The molded body having a cylindrical shape, obtained in process (2), was cut into a length of 60 mm by using a cutting apparatus having a cutting disc as its cutting member. Thus, a molded body having a size of 160 mm in diameter×60 mm in length in the longitudinal direction was obtained.

(4) Drying Process

The cylindrical molded body, obtained in process (3), was dried at 200° C. for 3 hours under normal atmosphere by using a microwave drying apparatus and a hot-air drying apparatus so that moisture contained in the molded body was removed.

(5) Degreasing Process

The cylindrical molded body, obtained in process (4), underwent a heating treatment at 400° C. for 3 hours in an electric furnace under normal atmosphere so that organic substances contained in the molded body were removed.

(6) Heating Treatment and Acid Treatment

The cylindrical molded body, obtained in process (5), underwent a heating treatment at 950° C. for 5 hours in a firing furnace under normal atmosphere.

Thereafter, the resulting molded body was immersed into a HCl solution of 4 mol/l at 90° C. for one hour so that an acid treatment is carried out thereon, and this again underwent a heating treatment at 1050° C. for 5 hours to manufacture a honeycomb structure.

(7) Catalyst-supporting Process

The honeycomb structure obtained in process (6) was immersed in a solution containing 10 g of CZ(nCeO2.mZrO2), 40 ml of water and an appropriate amount of pH adjusting agent for 5 minutes, and a firing process is then carried out thereon at 500° C. so that CeO2 and ZrO2 were supported thereon as oxide catalysts.

(8) Manufacturing Process of Lamination Member for End Portion

After a metal plate containing Ni—Cr alloy had been machined into a disc shape having a size of 160 mm in diameter×1 mm in thickness, a laser machining processes is carried out on this so that a lamination member for an end portion with holes of 4.5 mm×4.5 mm formed in a checkered pattern was manufactured. Two lamination members for end portions were manufactured in this process, and holes were formed on these lamination members for end portions at respectively different positions so that sealed portions were made different between the end face on the inlet side and the end face on the outlet side of the honeycomb structure when the lamination members for end portions were laminated in the following lamination process.

(9) Canning Process

First, a casing (metal container) having a tube-shaped (cylindrical) shape with a pressing metal member attached on one side was vertically placed with the side on which the member had been attached facing down. After one sheet of the lamination member for an end portion, obtained in process (8), had been laminated thereon, the honeycomb structure, obtained in the above-mentioned process (7), was placed with the holes of the lamination member for an end portion being fitted to the positions of the cells of the honeycomb structure, and lastly, one sheet of the lamination member for an end portion was laminated thereon, with the pressing metal member being attached to the other end and fixed thereon; thus, a honeycomb filter having a length of 60 mm was manufactured.

In this process, the lamination members for end portions were laminated in such a manner that sealed portions were made different between the end face on the inlet side and the end face on the outlet side of the honeycomb filter (so that only either one of the ends of the superposed cells was sealed).

Here, in the present canning process, one honeycomb structure was placed in the casing, and the lamination members for end portions were laminated (placed) on each of the two end portions. Supposing that this honeycomb structure forms one lamination member, the state of the honeycomb filter after the completion of the present canning process corresponds to a state in which the total three sheets of the lamination members including the lamination members for end portions are laminated and placed on the casing, and the honeycomb structure thus formed without lamination interface is referred to as one sheet of lamination member.

Example 2

By using a resin-curing process (process of vertical installation of cores) as the method for manufacturing the honeycomb structure, a honeycomb structure was manufactured.

(1) Mixing Process

First, 14.0 parts by weight of alumina fibers (average fiber length: 0.3 mm, average fiber diameter: 5 μm) containing 72% of alumina and 28% of silica, 7.1 parts by weight of glass fibers (average fiber diameter: 9 μm, average fiber length: 3 mm) and 78.9 parts by weight of a thermosetting resin (epoxy resin) were mixed, and sufficiently stirred to prepare a mixture.

(2) Process of Vertical Installation of Cores and Mixture-filling Process

The mixture obtained in process (1) was poured into a tube-shaped (cylindrical) container (inner diameter: diameter 160 mm×60 mm in length in the longitudinal direction) in which pillar-shaped cores such as core sand (4.5 mm×4.5 mm×60 mm) were vertically installed in a lattice pattern in a plan view with intervals of 2 mm; thus, the container was filled in with the mixture.

(3) Resin-curing Process

The tube-shaped (cylindrical) container, filled in with the mixture, obtained in process (2) underwent a heating treatment at 120° C. for 30 minutes so that the epoxy resin was cured to form a cured resin body.

(4) Core Removing Process

The tube-shaped (cylindrical) container was removed from the cured resin body, and by sticking the core portions by using a thin rod-shaped member, the cores were broken and removed from the cured resin body. Thus, a molded body having a size of 160 mm in diameter×60 mm in length in the longitudinal direction was obtained.

Moreover, the processes of the drying process and thereafter were carried out in the same manner as in Example 1 so that a honeycomb structure and a honeycomb filter were manufactured.

Example 3

A honeycomb structure and a honeycomb filter were manufactured in the same manner as in Example 2, except that immediately after having preliminarily added 10 parts by weight of a curing agent for epoxy resin to the mixture, the mixture-filling process was carried out so that the epoxy resin was cured by the function of the curing agent, and that the heating treatment for curing resin was not carried out.

Example 4

A honeycomb structure and a honeycomb filter were manufactured in the same manner as in Example 2, except that cores containing polycarbonate (PC) were used and that the degreasing process of the epoxy resin and the removing process of the cores were simultaneously carried out by the heating process for the degreasing process after the formation of the cured body.

Example 5

A honeycomb structure and a honeycomb filter were manufactured in the same manner as in Example 2, except that cores containing tin serving as metal having a low-melting point were used and that, after the formation of the cured body, it was heated to 240° C. of the melting point of tin or more so that the cores were melted and removed.

Example 6

A honeycomb structure and a honeycomb filter were manufactured in the same manner as in Example 2, except that cores made by melt-molding sodium chloride (NaCl) serving as water-soluble salt were used, and that, after the formation of the cured body, the cores were eluted and removed by dissolving the sodium chloride in warm water at 60° C.

Example 7

A honeycomb structure and a honeycomb filter were manufactured in the same manner as in Example 2, except that cores having a step difference, illustrated in FIG. 6C (with a portion of 4.5 mm×4.5 mm and a portion of 3.5 mm×3.5 mm having a total length of 60 mm) were used.

Example 8

By using a resin-curing process (metal molding) as the method for manufacturing the honeycomb structure, a honeycomb structure was manufactured.

(1) Mixing Process

A mixture was prepared in the same manner as in Example 2.

(2) Mixture-filling Process

The mixture obtained in process (1) was poured into a frame member, containing Ni—Cr stainless steel, which is configured by a round bottom plate (160 mm in diameter) on which pillar members having a pillar shape (4.5 mm×4.5 mm×60 mm) were vertically installed in a lattice pattern with intervals of 2 mm and a tube-shaped (cylindrical) container (inner diameter: diameter 160 mm×60 mm in length in the longitudinal direction) installed on the periphery of the bottom plate; thus, the frame member was filled with the mixture.

(3) Resin-curing Process

A cured resin body was manufactured in the same manner as in Example 2.

(4) Frame Member Removing Process

The entire frame member was separated and removed by drawing the pillar members out of the cured resin body as well as by detaching the outer frame therefrom. Thus, a molded body having a size of 160 mm in diameter×60 mm in length in the longitudinal direction was obtained. Moreover, a honeycomb structure and a honeycomb filter were manufactured in the same manner as in Example 2 by carrying out the processes of the drying process and thereafter.

Example 9

By using a three-dimensional sheet-forming process as the method for manufacturing the honeycomb structure, a honeycomb structure was manufactured.

(1) Mixing Process

First, 1.0 part by weight of alumina fibers (average fiber length: 0.3 mm, average fiber diameter: 5 μm) made from 72% of alumina and 28% of silica, 0.5 parts by weight of glass fibers (average fiber diameter: 9 μm, average fiber length: 3 mm), 0.08 parts by weight of an organic binder (polyvinyl alcohol) and 50 parts by weight of water were mixed, and sufficiently stirred to prepare a mixture.

(2) Mixture-filling Process and Stirring Process

The mixture obtained in process (1) was charged into a liquid-filling portion of a vessel having a volume of 50 liters with the height of the liquid-filling portion being set to 200 mm, and by activating a vibrator attached to the vessel, the mixture in the vessel was stirred so as to be uniformly mixed.

(3) Dehydration Process and Compressing Process (Three-dimensional Sheet-forming Process)

By activating a draining pump with the cock on the vessel lower portion being open, the moisture of the mixture inside the vessel was drained through the mesh so that the mixture was dehydrated to form a dehydrated body.

Next, a pressing plate was mounted thereon, with the through holes of the pressing plate being fitted to the positions of the pillar-shaped masks, and by operating motors coupled to ball screws, the pressing plate was pressed to be inserted in a direction toward the lower portion until the dehydrated body had been compressed to 60 mm in length so that a compressed body was formed.

(4) Mask-removing Process

By removing the pillar-shaped masks from the compressed body, a molded body having a size of 160 mm in diameter×60 mm in length in the longitudinal direction was obtained.

Moreover, a honeycomb structure and a honeycomb filter were manufactured by carrying out the processes of the drying process and thereafter in the same manner as in Example 1.

Comparative Example 1

By using a process for laminating a number of sheet-shaped lamination members as the method for manufacturing the honeycomb structure, a honeycomb structure was manufactured.

(1) Preparation of Sheet-forming Slurry

By using the same processes as in Example 1, a mixture was prepared, and this was sufficiently stirred to prepare a slurry for use in sheet-forming.

(2) Sheet-forming Process

The slurry obtained in process (1) was formed into a sheet by using a mesh having a diameter of 160 mm, and the resulting sheet was dried at 150° C., and then a punching process is carried out thereon so that a sheet-shaped inorganic fiber aggregated body having a thickness of 1 mm with cells, each having a size of 4.5 mm×4.5 mm, being formed on the entire surface with mutual intervals of 2 mm, was formed.

(3) Catalyst-supporting Process

The sheet-shaped inorganic fiber aggregated body obtained in process (2) was immersed in a solution containing 10 g of CZ(nCeO2.mZrO2), 40 ml of water and an appropriate amount of pH adjusting agent for 5 minutes, and a firing process was then carried out thereon at 500° C. so that CeO2 and ZrO2 were supported thereon as oxide catalysts.

(4) Laminating Process

In the same manner as in Example 1, after one sheet of the lamination member for an end portion had been laminated, 68 sheets of the sheet-shaped inorganic fiber aggregated bodies were laminated, with the holes of the lamination member for an end portion being fitted to the positions of the through holes of the sheet-shaped inorganic fiber aggregated bodies, and lastly, one sheet of a metal lamination member was laminated thereon, and this further underwent a pressing process, and, thereafter, the pressing metal member was attached to the other end and fixed thereon; thus, a honeycomb filter having a length of 60 mm was manufactured.

In this process, the metal lamination members were laminated in such a manner that sealed portions were made different between the end face on the inlet side and the end face on the outlet side of the honeycomb filter (so that only either one of the ends of the superposed cells was sealed).

(Evaluation)

Figure 10:
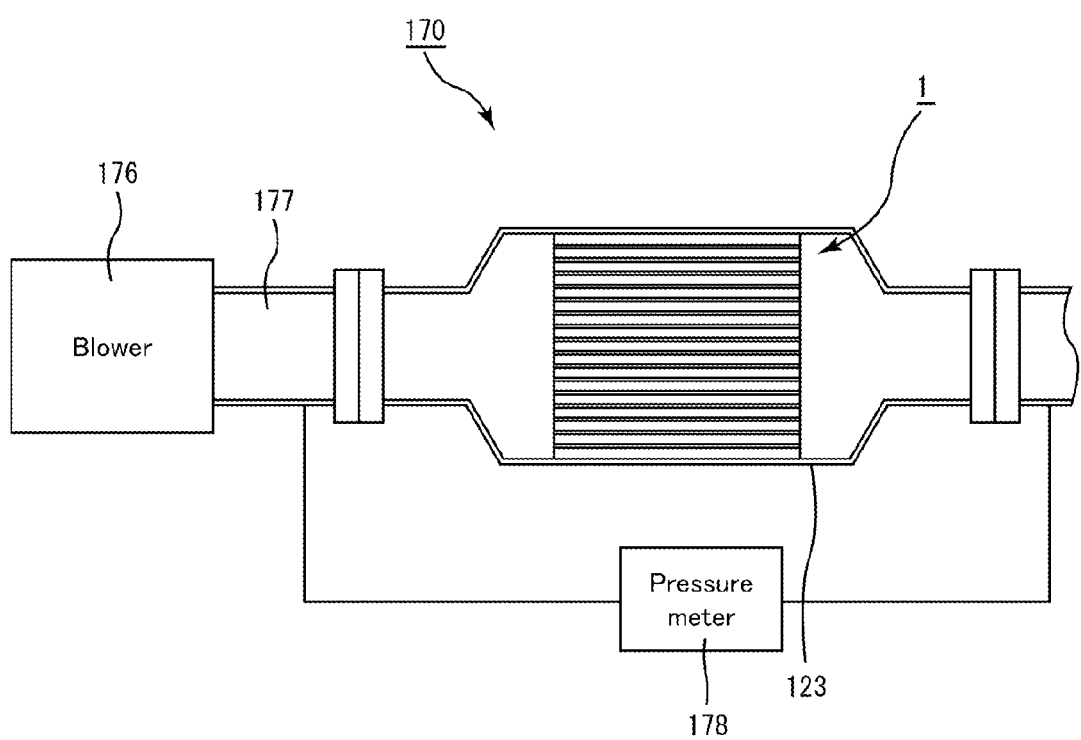
FIG. 10 is an explanatory drawing that illustrates a pressure loss measuring apparatus.

A pressure loss measuring apparatus 170 as illustrated in FIG. 10 was used for measurements on the pressure loss. FIG. 10 is an explanatory drawing that illustrates the pressure loss measuring apparatus.

This pressure loss measuring apparatus 170 has a structure in which a honeycomb filter 1, fixed in a metal casing 171, is placed in an exhaust gas pipe 177 connected to a blower 176, and a pressure meter 178 is attached so as to detect pressures before and after the honeycomb filter 1.

Here, the blower 176 was driven so that the flow rate of exhaust gases was set to 750 m3/h, and after a lapse of 5 minutes from the start of the driving operation, a pressure difference (pressure loss) was measured.

The results are shown in Table 1.

TABLE 1

|  | Manufacturing method | Length (mm) | Number of sheets (number) | Irregularities in through hole | Core material | Pressure loss (kPa) |
|---|---|---|---|---|---|---|
| Example 1 | Extrusion-molding | 60 | 1 | No | — | 14.6 |
| Example 2 | Resin curing (with cores vertically installed) | 60 | 1 | No | Core sand | 14.4 |
| Example 3 | Resin curing (with cores vertically installed) | 60 | 1 | No | Core sand | 14.4 |
| Example 4 | Resin curing (with cores vertically installed) | 60 | 1 | No | PC | 14.4 |

TABLE 1-continued

|  | Manufacturing method | Length (mm) | Number of sheets (number) | Irregularities in through hole | Core material | Pressure loss (kPa) |
|---|---|---|---|---|---|---|
| Example 5 | Resin curing (with cores vertically installed) | 60 | 1 | No | Tin | 14.5 |
| Example 6 | Resin curing (with cores vertically installed) | 60 | 1 | No | NaCl | 14.3 |
| Example 7 | Resin curing (with cores vertically installed) | 60 | 1 | Yes | Core sand | 13.5 |
| Example 8 | Resin curing (metal molding) | 60 | 1 | No | — | 14.5 |
| Example 9 | Three-dimensional sheet-forming | 60 | 1 | No | — | 14.2 |
| Comparative Example 1 | A number of sheets laminated | 60 | 68 | No | — | 16.2 |

As shown in Table 1, with respect to the honeycomb structures relating to Examples 1 to 9 in which the laminated sheet was only one sheet, the initial pressure loss was as low as from 13.5 to 14.6.

In particular, in the case of Example 10 with irregularities formed in the through hole, the pressure loss was low.

In contrast, in the honeycomb structure relating to comparative Example 1, when the number of laminated sheets is as many as 68 sheets, the pressure loss presumably becomes high due to many lamination interfaces.

Based on these facts, it is found that by using a honeycomb structure in which only one laminated sheet is used (that is, a honeycomb structure having inorganic fibers integrally formed), the pressure loss tends to be reduced in purifying exhaust gases, in comparison with a honeycomb structure in which a number of sheet-shaped inorganic fiber aggregated bodies are laminated.

Obviously, numerous modifications and variations of the present invention are possible in light of the above teachings. It is therefore to be understood that within the scope of the appended claims, the invention may be practiced otherwise than as specifically described herein.

The invention claimed is:

1. A pillar-shaped honeycomb structure comprising:
   a plurality of cells extending along a substantially longitudinal direction of the honeycomb structure with a wall portion therebetween,
   wherein the honeycomb structure without lamination interfaces extending across adjacent cells mainly comprises inorganic fibers.

2. The honeycomb structure according to claim 1, wherein the honeycomb structure comprises an inorganic material which fixes the inorganic fibers each other.

3. The honeycomb structure according to claim 2,
   wherein the inorganic material fixes the inorganic fibers at intersections of said inorganic fibers, and
   wherein the inorganic material is locally provided at the intersections.

4. The honeycomb structure according to claim 2, wherein the inorganic fibers are fixed to each other by melting and solidifying the inorganic material.

5. The honeycomb structure according to claim 2, wherein the inorganic material contains silica.

6. The honeycomb structure according to claim 1, wherein said inorganic fibers comprise at least one selected from the group consisting of silicon carbide, alumina, basalt, silica, silica-alumina, titania and zirconia.

7. The honeycomb structure according to claim 1, wherein a catalyst is supported on at least one portion of said inorganic fibers.

8. The honeycomb structure according to claim 7, wherein said catalyst comprises an oxide catalyst containing at least $CeO_2$.

9. The honeycomb structure according to claim 7, wherein said catalyst is at least one selected from the group consisting of $CeO_2$, $ZrO_2$, $FeO_2$, $Fe_2O_3$, $CuO$, $CuO_2$, $Mn_2O_3$, $MnO$ and composite oxides having the composition formula $A_nB_{1-n}CO_3$, wherein A is La, Nd, Sm, Eu, Gd or Y, B is an alkali metal or alkali-earth metal, and C is Mn, Co, Fe or Ni.

10. The honeycomb structure according to claim 7, wherein an amount of the catalyst supported on the honeycomb structure is at least about 10 g/l and at most about 200 g/l with respect to the apparent volume of said honeycomb structure.

11. A honeycomb filter comprising:
    the honeycomb structure according to claim 1,
    wherein either one of a first end or a second end of each cell of said plurality of cells is sealed and wherein the honeycomb structure is configured as a filter.

12. The honeycomb filter according to claim 11, wherein said honeycomb filter includes:
    either one of a first end or a second end of each cell of said plurality of cells that is sealed, or
    lamination members for end portions containing metal laminated on each of two end portions of the honeycomb structure; and
    wherein said honeycomb structure is installed in a metal container.

13. A method for manufacturing the honeycomb structure according to claim 1, said method comprising:
    mixing inorganic fibers A with inorganic fibers B and/or inorganic particles C to prepare a mixture, the inorganic fibers B and inorganic particles C having a melting temperature which is lower than a melting temperature or a sublimating temperature of the inorganic fibers A;
    extrusion-molding the mixture to form a pillar-shaped molded body having a number of cells formed in a longitudinal direction by using a die having holes; and
    heating said pillar-shaped molded body at a temperature equal to or lower than a heat-resistant temperature of said inorganic fibers A and at the temperature equal to or higher than a softening temperature of said inorganic fibers B and/or said inorganic particles C to produce a honeycomb structure.

14. The method for manufacturing the honeycomb structure according to claim 13, wherein said inorganic fibers B and/or said inorganic particles C contain silica.

15. The method for manufacturing the honeycomb structure according to claim 13, wherein said inorganic fibers A comprise at least one selected from the group consisting of silicon carbide, alumina, basalt, silica, silica-alumina, titania and zirconia.

16. The method for manufacturing the honeycomb structure according to claim 13, wherein a blending ratio of said inorganic fibers A to said inorganic fibers B and/or said inorganic particles C is in the range of about 2:8 to about 8:2.

17. The method for manufacturing the honeycomb structure according to claim 13, further comprising:
providing an oxide catalyst on said inorganic fibers A and/ or said inorganic fibers B.

18. The method for manufacturing the honeycomb structure according to claim 13, further comprising:
laminating lamination members for end portions mainly containing metal on each of two end portions of the honeycomb structure.

19. A method for manufacturing a honeycomb structure said method comprising:
mixing inorganic fibers A with inorganic fibers B and/or inorganic particles C to prepare a mixture, the inorganic fibers B and inorganic particles C having a melting temperature which is lower than a melting temperature or a sublimating temperature of the inorganic fibers A;
extrusion-molding the mixture to form a pillar-shaped molded body having a number of cells formed in a longitudinal direction by using a die having holes;
heating said pillar-shaped molded body at a temperature equal to or lower than a heat-resistant temperature of said inorganic fibers A and at the temperature equal to or higher than a softening temperature of said inorganic fibers B and/or said inorganic particles C to produce a honeycomb structure; and
carrying out an acid treatment on said pillar-shaped molded body.

20. A method for manufacturing a honeycomb structure, said method comprising:
mixing inorganic fibers A, inorganic fibers B and/or inorganic particles C, and resin to prepare a mixture, the inorganic fibers B and inorganic particles C having a melting temperature which is lower than a melting temperature or a sublimating temperature of the inorganic fibers A;
providing a tube-shaped container having a plurality of cores therein, the cores being provided substantially in parallel with a longitudinal direction of the tube-shaped container and provided in a lattice pattern on a plane surface substantially vertical to the longitudinal direction;
filling said mixture into said container;
curing the resin contained in said mixture to form a cured resin body;
removing said cores from said cured resin body to provide a pillar-shaped molded body having a number of cells formed in a longitudinal direction;
heat-degreasing said pillar-shaped molded body to remove organic substances from said pillar-shaped molded body; and
heating said degreased body at a temperature equal to or lower than the heat-resistant temperature of the inorganic fibers A and equal to or higher than the softening temperature of the inorganic fibers B and/or the inorganic particles C to produce a honeycomb structure.

21. The method for manufacturing the honeycomb structure according to claim 20,
wherein
said inorganic fibers B and/or said inorganic particles C contain silica.

22. A method for manufacturing a honeycomb structure, said method comprising:
mixing inorganic fibers A, inorganic fibers B and/or inorganic particles C, and resin to prepare a mixture, the inorganic fibers B and inorganic particles C having a melting temperature which is lower than a melting temperature or a sublimating temperature of the inorganic fibers A;
filling said mixture into a frame member which comprises a bottom plate, pillar members for forming cells of the honeycomb structure, and an outer frame formed so as to enclose a periphery of the bottom plate and the pillar members, the pillar members being connected to the bottom plate extending substantially perpendicularly to the bottom plate and ananged in a lattice pattern on the bottom plate;
curing the resin contained in said mixture filled into the frame member to form a cured resin body;
removing said pillar members from said cured resin body and detaching the frame member to form a pillar-shaped molded body having a number of cells formed in a longitudinal direction;
heat-degreasing said pillar-shaped molded body having a number of cells to remove organic substances from said pillar-shaped molded body; and
heating said degreased molded body at a temperature equal to or lower than the heat-resistant temperature of said inorganic fibers A, and equal to or higher than the softening temperature of said inorganic fibers B and/or said inorganic particles C to produce a honeycomb structure.

23. The method for manufacturing the honeycomb structure according to claim 22, wherein said inorganic fibers B and/or said inorganic particles C contain silica.

24. A method for manufacturing a honeycomb structure, said method comprising:
providing a vessel comprising a vessel main body, a mesh formed on a bottom portion of said vessel main body, pillar-shaped masks that are installed substantially vertically to said mesh and in a lattice pattern on the mesh and that are used for forming cells of the honeycomb structure, and a liquid-filling cavity formed between the pillar-shaped masks;
mixing inorganic fibers A with inorganic fibers B and/or inorganic particles C to prepare a mixture, the inorganic fibers B and inorganic particles C having a melting temperature which is lower than a melting temperature or a sublimating temperature of the inorganic fibers A;
providing the mixture into said liquid-filling cavity;
discharging moisture from said mixture through said mesh to dehydrate the mixture to form a dehydrated body;
removing said pillar-shaped masks from the dehydrated body to provide a pillar-shaped molded body having a number of cells formed in a longitudinal direction; and
heating said pillar-shaped molded body at a temperature equal to or lower than the heat-resistant temperature of said inorganic fibers A and equal to or higher than the softening temperature of said inorganic fibers B and/or said inorganic particles C to produce a honeycomb structure.

25. The method for manufacturing the honeycomb structure according to claim 24, wherein said inorganic fibers B and/or said inorganic particles C contain silica.

* * * * *